United States Patent [19]

Rushbrooke et al.

[11] Patent Number: 5,828,067

[45] Date of Patent: Oct. 27, 1998

[54] IMAGING METHOD AND APPARATUS

[75] Inventors: John Gordon Rushbrooke; Claire Elizabeth Hooper; William Wray Neale; Richard Eric Ansorge, all of Cambridge, United Kingdom

[73] Assignee: Cambridge Imaging Limited, Cambridge, United Kingdom

[21] Appl. No.: 619,576

[22] PCT Filed: Oct. 20, 1994

[86] PCT No.: PCT/GB94/02301

§ 371 Date: Mar. 22, 1996

§ 102(e) Date: Mar. 22, 1996

[87] PCT Pub. No.: WO95/11461

PCT Pub. Date: Apr. 27, 1995

[30] Foreign Application Priority Data

Oct. 20, 1993 [GB] United Kingdom .................... 9321638
Mar. 23, 1994 [GB] United Kingdom .................... 9405755

[51] Int. Cl.$^6$ .................................................. G01T 1/208
[52] U.S. Cl. ...................................................... 250/370.11
[58] Field of Search ........................................ 250/370.11

[56] References Cited

U.S. PATENT DOCUMENTS

| 4,922,092 | 5/1990 | Rushbrooke et al. | 250/213 VT |
| 4,931,647 | 6/1990 | Hiruma | 250/368 |
| 5,465,284 | 11/1995 | Karellas | 378/62 |
| 5,475,225 | 12/1995 | Stettner | 250/370.11 |

FOREIGN PATENT DOCUMENTS

| 2626679 | 8/1989 | France | 250/370.11 |

OTHER PUBLICATIONS

Ljunggren, "Beta Camera For Static And Dynamic Imaging of Charged–Particle Emitting Radionuclides in Biologic Samples", Journal of Nuclear Medicine, vol. 31, No. 12, Dec, 1990, pp. 2058–2063.

Eikenberry, "A Two–Dimensional X–Ray Detector With A Slow–Scan Charge–Coupled Device Readout", IEEE Transactions On Nuclear Medicine, vol. 33, No. 1, Feb./1986, pp. 542–545.

Dominik, "A Gaseous Detector For High–Accuracy Autoradiography of Radioactive Compounds With Optical Readout of Avalanche Positions", Nuclear Instrumen. & Methods In Physics Research, vol. A278, No. 3, Jun./15/1989, pp. 779–787.

Primary Examiner—Constantine Hannaher
Attorney, Agent, or Firm—Lee, Mann, Smith, McWilliams, Sweeney & Ohlson

[57] ABSTRACT

A method of detecting the presence and position of radio isotope material in a sample is described comprising the steps of: exposing the sample to a phosphor, repetitively imaging the phosphor onto an image intensified CCD camera, scanning the camera CCD array and interrogating the charge pattern thereon following each exposure, performing measurements on the data signals obtained thereby to identify clusters of data values from adjacent regions of the array caused by light emitted by the image intensifier onto those regions and comparing the measurements with threshold values and parameter values so as to distinguish clusters resulting from light emitted as a result of radioactive decay events energizing the phosphor, from other light producing events, computing the centroid of each cluster of data values identified as a radioactive decay event with reference to the camera array and storing the centroid coordinates in a memory together with the centroid coordinates of any other radioactive decay produced clusters identified during the same interrogation. Coordinates from each of a succession of interrogations of the same sample are stored in an accumulation store, which can be read out to give a list of recorded events and/or used to produce a display of the events superimposed on an outline of the sample. The samples are carried on fibre optic plates in contact with the photocathode and event coordinates are stored in memory as they are detected, so that the display is updated as the events occur. Low noise bi-alkali material is used for the photocathode and the CCD camera is operated in inverted mode to reduce noise.

14 Claims, 14 Drawing Sheets

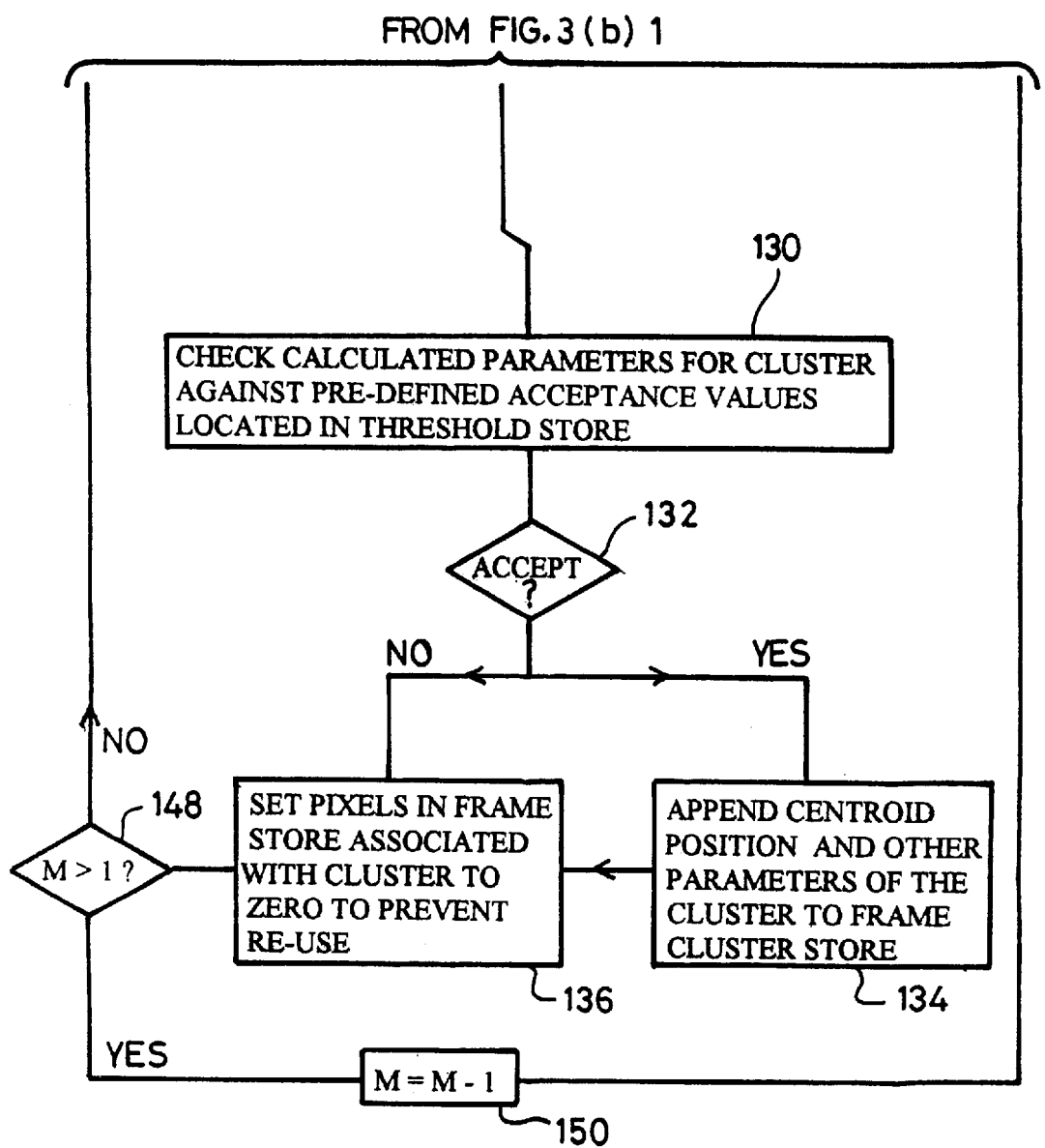
Fig. 3(b)2

IMAGING METHOD AND APPARATUS

Field of invention

This invention concerns methods and apparatus for detecting radioisotope labelled materials which emit radiation such as beta particles.

The invention is of application in the field of radioisotopic diagnostics and analysis and for performing measurements and analysis on labelled immunoassays, tissue sections, microbiological specimens, cellular specimens, cellular monolayers, reporter genes. DNA and/or protein gels and blots.

It is of particular application to diagnostic analysis of samples in which the concentration of radioisotope varies considerably from one region to another in the field of view and/or in which two or more different radioisotopes are used to label different materials in a sample and in which some or all of the different radioisotopes may be present in the field of view. In this type of differential labelling, the different radioisotopes are selected so as to possess significantly different radio active energies to allow them to be identified, so that in consequence a wide dynamic range of energy levels is present in a sample.

Definition

The term phosphor as will be employed herein is not intended to be restricted to conventionally understood phosphors such as zinc cadmium sulphide: silver which when bombarded by alpha or beta particles or by gamma radiation in response to this incident energy will emit photons of electromagnetic energy in the visible range of the em spectrum, but is intended also to include any material which, when stimulated by incident energy, will emit energy which is capable of directly or indirectly altering the charge pattern on a CCD camera and which may be of the same type (or a different type) from the incident stimulating energy and includes polymer media doped with rare earth chelates or other scintillating material, with or without activators or wavelength shifting devices.

BACKGROUND OF THE INVENTION

As two examples (a) the extent by which drugs are taken in by tissue and/or cells and (b) the detection of antigen sites and receptor binding sites for example in medical diagnosis, research and pharmacology assays, can be determined by labelling the drug or antigen with a radioisotope such as Tritium or Carbon 14, or Sulphur 35 or Phosphorus 32, exposing the organism or sample therefrom or other assay to the labelled drug (or to the labelled antigen or antibody or other biological marker) and after a take-up period, examining the sample for beta particles, gamma rays or other radiation emitted from any isotope present in the sample. Historically this has been achieved by exposing a photographic plate to the sample in contact therewith, which when the former is developed will contain visually distinctive regions corresponding to any emitted radiation, surrounded by visually different regions corresponding to areas from which no radiation has been emitted. An alternative approach, usually for small samples, is to introduce a Phosphor film between the sample and the plate as a means of increasing sensitivity and/or facilitating direct electronic detection. Typically after exposure and development, black regions in a monochrome photographic plate correspond to radiation (such as beta particle emissions) and light regions the converse. However depending on the photographic emulsion employed and the development process, the contrast may be reversed.

Unfortunately the small amount of radio isotope present in a typical sample and the rate of radiation (such as beta particle emission) from such isotopes as are appropriate for labelling in such techniques, is such that photographic exposure times of days or weeks have been found necessary and this coupled with the poor dynamic range of photographic emulsions has led to alternative techniques being investigated.

PRIOR ART

WO92/03836 (Charon et al) describes inter alia a system in which radio isotope labelled material is exposed to a primary phosphor which emits photons in response to the impingement thereon of beta particles. The primary phosphor is imaged onto an image intensifier photocathode the light output of which provides the light to a CCD array in a camera. The electrical charge collected by a conductive film on the final luminescent phosphor of the image intensifier is converted into an electrical signal which is interrogated and a trigger signal is derived therefrom by thresholding the electrical signal.

The threshold is set at a level such that if no beta particle has impinged on the primary phosphor, the electrical signal fails to satisfy the threshold.

If a beta particle impinges on the primary phosphor, the resulting charge on the conductive film generates an electrical signal which satisfies the threshold and a trigger signal is generated.

This signal is used to clear the charge pattern on the CCD array and to instigate an immediately following integration period and read-out cycle of the CCD.

By using a sufficiently long decay phosphor for the final luminescent phosphor of the image intensifier, it is claimed that the CCD array will still be subjected to photons from the phosphor arising from the same originating event for a sufficient period of time to permit a useful signal to be obtained from the CCD during the subsequent read-out cycle.

The system was developed to enable beta particle emission events (which only occur infrequently), to be detected. The system overcomes the problem of noise integration on a CCD which is exposed to an image intensifier output during the quiescent periods between events. However, the system relies for its success on the use of a phosphor in the image intensifier which has a long decay time relative to the time needed to clear the CCD array. This is necessary if the beta emission event is to be used to generate the trigger signal to clear the CCD, since the latter will only see the decaying portion of the event originating signal thereafter and it is this which is used to generate the charge pattern on the CCD for subsequent read-out.

By its nature the process discards useful information and it is the need for a relatively long decay phosphor and CCD read-out time which ultimately determine the minimum time between trigger signals and hence the minimum time between events which can be separately identified. As reported by Y. Charon et al in Nuclear Instruments and Methods in Physics Research A292 (1990) 179–186 and A310 (1991) 379–384 North-Holland Elsevier Science Publishers BV, this minimum time between events is currently of the order of 0.1 to 1 second. By its nature therefore the Charon et al system is currently limited to event frequencies of less than 10 per second.

As mentioned as well in Nuclear Instruments and Methods A273 (1988) pages 748 to 753 the Charon et al system does not plot pixel by pixel but considers the whole frame and considers data from any high density area in the frame. A 1 second time period between events is necessary in order that it is improbable for two events to occur during the same frame. However, were this period to be reduced it is more likely that an incorrect result would be obtained.

In a review of their beta Imager in Research Reports Volume 17 No.2(1994) Y Charon et al demonstrate the limitations of the technique in column 3 lines 1 to 13 on page 343. The dead time associated with the triggering process limits the number of events which can be handled to 51 dpm/mm$^2$ for 6% error in the dead-time correction to the event rate.

It is an object of the present invention to provide a method and apparatus which does not suffer from these defects.

It is a further object of the present invention to provide an improved method and apparatus by which radio isotope disintegrations occurring at high event rates from a plurality of different points in a sample can be detected and mapped in two dimensions and quantified as regards number, and/or frequency of emission and/or associated energy levels.

It is a further object to provide a method and apparatus as aforesaid which is nevertheless capable of detecting and mapping points from which radio isotope disintegrations are occurring at low event rates in the same sample as those at high event rates.

DESCRIPTION OF THE INVENTION

According to one aspect of the present invention a method of detecting the presence and position of radioactive material in a sample comprises the steps of exposing the sample to a phosphor, repetitively imaging the phosphor onto an image intensified CCD camera, scanning the camera CCD array and interrogating the charge pattern thereon following each exposure, performing measurements on the data signals obtained to identify clusters of data values from adjacent regions of the array caused by light emitted by the image intensifier onto those regions and comparing the measurements with threshold values and parameter values so as to distinguish clusters resulting from light emitted as a result of radioactive decays energizing the phosphor from other light producing events, computing the centroid of each radioactive decay produced cluster of data values with reference to the camera array and storing the centroid coordinates in a memory together with the centroid coordinates of any other radioactive decay produces clusters identified during the same interrogation.

The method may include the further step of storing the coordinates from each of a succession of interrogations of the same sample in an accumulation store, which can be read out to give a list of recorded events and/or used to produce a display of the events which may also be superimposed on an outline of the sample.

According to another aspect of the present invention a method of detecting the presence and position of radioactively labelled material in an area of sample comprises the steps of:

1. exposing an area of the sample to an area of a phosphor so that radioactive decay events produce photon emission events,
2. imaging the phosphor onto the photocathode of an image intensifier means, the output of which provides the optical input for a CCD camera,
3. repetitively scanning the CCD array of the camera, each scan corresponding to an interrogation of the charge pattern on the array and being preceded by an exposure period and followed by a resetting step, which initiates the beginning of the next following exposure period,
4. generating during each interrogation data signals whose values describe the charge pattern on the array,
5. performing measurements on the data signals to identify clusters of data values from adjacent regions of the array indicative that photon emission from the image intensifier has impinged thereon, and
6. identifying a center position of each identified cluster of such data values and storing the center coordinates in a memory together with the center coordinates of any other identified clusters occurring during the same interrogation.

Preferably the data signal values generated for each interrogation are stored and subsequently read out by a computing and data processing means for performing the said measurements thereon.

Preferably coordinates from each of a succession of interrogations of the same sample are stored in an accumulation store.

The invention also lies in the further step of reading out the stored coordinates and producing a list thereof.

The method also lies in the further step of operating a visual display system so as to reproduce therein the scanned area of the CCD array and modulating the light producing element of the display system so as to generate visually distinguishable features in the display at positions defined by the stored coordinates.

Choice of sample

Preferably very thin samples are employed, of the order of 10 microns thick or less, to achieve optimum spatial resolution.

Choice and position of phosphor

In general phosphors are supported on thin films which need to be closely coupled to the photocathode of the image intensifier if light scatter is not to degrade the image quality and resolution.

Where physical separation is required this is preferably achieved using a thin fiber optic plate as a window between the phosphor and the photocathode.

Alternatively if the phosphor produces sufficient light from each beta disintegration, a lens may be used to focus the light emissions onto the image intensifier photocathode.

Likewise the sample will usually need to be in contact with the phosphor to preserve image quality and resolution and also since the energy levels of beta particle disintegrations of radio isotope materials normally used in biological specimens can be very low, and are then barely sufficient to energize the phosphor.

Examples of phosphors which may be used are P20 (Zinc cadmium sulphide: silver) or P47 (Yttrium silicate: cerium).

Image intensifier

A so-called first generation image intensifier is preferred.

Noise reduction can be enhanced if a low noise material is selected for the photocathode of the image intensifier.

Preferably a first generation image intensifier is selected having a low noise bi-alkali material photocathode.

CCD Camera operation

Preferably the CCD camera is operated in so-called "inverted mode" so that contributions to background from fluctuations in thermal noise in its CCD array, (so called "shot noise"), at room temperatures, can be reduced.

To reduce dead time, the duration of each interrogation of the charge pattern of the CCD array and the associated resetting of the CCD array, is preferably as short as possible and will normally be much shorter than the duration of the preceding exposure period.

According to a preferred feature of the method, the addressing of the CCD array is organized so as to define a plurality of sub-regions which together make up the optically sensitive region of the camera array. The quantity of photon energy incident on each sub-region during an exposure period determines the charge to be found on that sub-region during the following interrogation, so that an electrical signal indicative of the photon energy incident on each sub-region can be obtained and stored as an electrical information signal for each sub-region.

Display of CCD camera signal

For display purposes a light producing element of a scanning display system may be modulated by the said electrical information signal obtainable from the interrogation of the CCD array, so as to generate a visual difference between one part of the display and another depending on the level of photon activity on the corresponding sub-regions of the CCD array during the preceding exposure period.

The display will in that event indicate the current radioactivity from the sample.

If instead the display system is modulated by signals obtained by repeatedly reading out the coordinate accumulation store previously referred to, the display will present a continually updated picture of the positions at which radioactivity has been detected in the sample.

A threshold may be applied to the information signals so that in the simplest case the modulation is two-state and sub-regions which have received photon energy greater than a value for example K. are displayed in one color and all other sub-regions are displayed in a contrasting color. Those regions displayed in the said one color will indicate that in those regions a greater level of radioactivity has occurred from the corresponding regions in the sample since the amount of light incident on the CCD is linked to the energy of the radioactive decay which energizes the phosphor in the first place.

Processing of CCD output signals

The sub-region related information signals may be employed to produce a list of coordinates at which events have occurred.

By storing all such event coordinates for each interrogation, the list will contain an accumulation of the events relating to the radioactivity over a period of time and which is continually updated from each interrogation of the CCD array.

An analysis of the information signals from one interrogation or from a succession of interrogations, will reveal the size and shape and position of those regions of the sample containing the radioactive material.

System sensitivity

The sensitivity of the imaging system (and therefore overall signal processing and image analyzing system) may be enhanced by optically coupling the sample-phosphor combination to the photocathode of the image intensifier by means of a fiber optic coupling plate, which advantageously may alter in cross-section from the face coupled to the sample-phosphor combination, to the face which couples to the image intensifier, the latter being commensurate with the area of the image intensifier input window and the former being commensurate with the area of the sample-phosphor combination.

If the area of the sample-phosphor is greater than the area of the image intensifier input window, and an appropriate fiber optic plate is selected, demagnification is achieved and a larger area of a sample (or a number of different samples simultaneously) can be viewed by the one image intensifier.

If a fiber optic plate is selected whose area increases between the sample and image intensifier, (the area of the latter still being commensurate with the image intensifier input), the latter will effectively view a magnified image of the sample, the magnification being determined by the ratio of the two areas.

By using tapering (converging or diverging) fiber optic plates, magnification or demagnification is achievable to the same extent as would be possible by using a lens system but with significantly less light loss. At low light levels this is of major importance.

Phosphor support

According to a still further feature of the invention, the phosphor material may be coated directly onto the surface of the fiber optic plate which couples to the sample, thereby eliminating the need for a separate support medium for the phosphor.

This is of considerable advantage over prior art techniques in which the phosphor has usually been supported on a Mylar sheet a registered trademark for a polyester made in extremely thin sheets of great tensile strength which has to be very thin (of the order of 5–10 microns) to minimize spreading of the phosphor originating light and loss of resolution. Such thin films are not only fragile but can crinkle and curl and in general are not uniform enough to permit location and quantification of the radiation emissions such as beta particle disintegration events, to the same level of accuracy as the present invention permits.

By supporting the phosphor on a fiber optic plate typically of glass, the invention permits the position of beta disintegration events to be computed from the charge pattern on a CCD with an uncertainty of typically only 10 microns.

The fiber optic coupling plate may be magnifying, de-magnifying or one-to-one and may comprise the input window, be additional to the window or he a second fiber optic plate which can be placed either on the magnifying/ demagnifying fiber optic coupling plate (where required) or in contact with the fiber optic input window of the camera itself.

A separate, additional fiber optic plate bearing a phosphor coating (as aforesaid) may be as little as 1mm in thickness, hence reducing cost and offering greater versatility for choice of phosphor material, for sample presentation, and the possibility of a disposable device separate from the overall camera optics.

According to a further preferred feature of the invention the phosphor layer may be applied directly to a fiber optic coupling plate by vapor deposition. Such a process enables a very thin (for example such as 1 micron thick) layer of uniform thickness to be applied over the surface of the plate.

Such a very thin, dense uniform phosphor layer laid directly onto a fiber optic plate, has advantages for imaging quality over a phosphor layer supported by a Mylar (Registered Trade Mark) film or similar device. Spatial resolution is improved because the energy deposition of the beta particle disintegration or other radiation producing source, is concentrated onto a thinner layer closer to the optical fibers and precise type and thickness of the phosphor can be optimized to the range of beta particle or other radiation energies pertaining to each isotope. For example a layer for Tritium would be thinner than a layer for Carbon 14.

The invention further envisages a disposable fiber optical coupling plate having applied thereto a vapor deposited dense but very thin layer of phosphor on the surface of the plate.

Elimination of data relating to unwanted events, noise etc

When dealing with low concentrations of labelled material, and radioisotope materials having low radiation rates (eg low beta disintegration rates), and low energies, it can be difficult to distinguish for example signals attributable to thermally stimulated noise electron emissions at the image intensifier photocathode, from those attributable to events caused by radioactive decay initiated photon activity from the phosphor.

As a first step to removing signals characteristic of thermally stimulated noise electron emissions within the image intensifier, solitary, small numerical value information signals are rejected and only groups of signals from contiguous sub-regions are retained for subsequent processing and analysis.

A preferred strategy for defining such a group is to identify from an interrogation single sub-regions having a photon activity signal value above a first threshold value T1, and to form a group if contiguous sub-regions of the identified sub-region have photon activity signals above a second, but lower threshold value T2.

Different threshold levels may need to be employed for different source-phosphor combinations, typical examples of which are Tritium-P20, Carbon 14-P20 and Carbon 14-P47.

Noise signal elimination may be performed by applying a sizing criterion to identified groups and rejecting groups which have fewer than a predetermined number of sub-regions. This will in general reject all groups characteristic of single photoelectrons which are predominantly associated with noise.

Selection of events as being beta particle disintegration events may be made by examination of the signal values from each group of contiguous sub-regions identified from each interrogation, and accepting a coordinate signal corresponding to a group if the photon activity signal sum for the group is greater than a threshold value equivalent to a required number of photoelectrons.

For Tritium, very low thresholds are needed, since ~5–10 photoelectrons only are likely to be produced at the photocathode on average for each Tritium radioactive decay. Typically the threshold value for Tritium per group of sub-regions of the CCD corresponding to the decay has to be set at the equivalent of 3 or 4 photoelectrons at the photocathode.

Determination of Cluster Center ie the Position of a Radioactive Particle in a Sample Having identified a group or cluster as a possible candidate for classification as a beta event, the position coordinates of a point within the area encompassing the sub-regions from the radiation appears to have originated must be identified, as being the best estimate of the position of the point in the sample from which the disintegrating particle originated.

The centroid of the area defined by the group may be used as the best estimate of that position. The centroid position coordinates may be computed to any desired level of accuracy and typically floating point coordinates are used so that the resolution is not limited to the resolution of the sub-regions.

Ion Events

In general, ion events arising in the image intensifier normally lead to signals of magnitude comparable to those due to radiation from beta particle disintegration events, and where possible these ion event signals must be identified and gated out. According to the invention this is achieved by applying appropriate thresholding algorithms to the signals from each identified group of sub-regions found during each interrogation and performing the identification in real time.

Identification can be achieved by noting the total charge on the CCD sub-regions of a group pertaining to an event, and noting the size of the group (for example the number of sub-regions within the group). Using both pieces of information, it is possible to determine the nature of the originating event. The relevant group can then be identified as one arising from a radioactive decay in the sample, and its position coordinates stored and/or displayed, or can be identified as one arising from an ion event, in which case it is rejected.

It has also been found beneficial to use a lower operating voltage for the image intensifier than would normally be employed, since in the case of a first generation image intensifier the effect is to reduce the size and number of internal ion events in the intensifier without affecting the sensitivity to photon events at the photocathode from the phosphor.

Particular applications of the invention (1) Single isotope labelling

The method of the invention permits analysis of the distribution of a labelling radio isotope material across a sample, both visually and electronically by computational analysis of electrical signals descriptive of the said distribution. It may be used for example to determine drug take-up by tissue and/or cells, and DNA,RNA or protein hybridization.

Since in practice light from the image intensifier as a result of each beta disintegration will cause charge to be deposited over more than one addressable region of the CCD camera array, the method according to the invention preferably includes the step of centroiding signals from a group of such sub-regions, identified as being linked to a single beta disintegration event, so as to estimate the position in the sample of the point from which the beta particle disintegration has emanated, to cause the charge distribution concerned, and identifying that position as being the point of interest from which the beta disintegration arose, and storing the coordinates of that position for subsequent mapping of beta emissions from the sample.

In practice the energies (and therefore CCD charges) of different beta disintegrations of the same isotope are not identical, but fall within a particular range within which they follow a particular distribution. It follows that the charges on the CCD array arising from a given isotope will produce a distribution of measured energies which is characteristic of that isotope and calibration of the photon activity related signals obtained by reading out the charge pattern during each interrogation, enables subsequent interrogation signals to be compared with a look-up table of isotope energy distributions to determine unknown amounts of isotopes if present.

(2) Multiple isotope labelling

If the presence and position of two or more differently labelled materials in the sample is required to be determined, then different isotopes must be used to enable the different substances to be identified, and the presence of the two or more different radio isotopes in the sample can be checked by identifying clusters as before and storing with each cluster not only the center coordinates but also an indication as to the isotope obtained by comparing the photon activity related signal summed from the sub-regions making up the cluster with a look-up table of values for different radio isotopes. The distribution of two or more different isotopes in the sample can of course only be analyzed if the range of actual radioactive decay energies of the one isotope is sufficiently different from the range of radioactive decay energies of the other.

The invention therefore also includes the step of selecting isotopes having appropriately different particle disintegration energy distributions to enable multiple labelling analysis.

References herein to radio isotopes is intended to include any radioactive substances whether isotope, mixture of isotopes or otherwise.

The invention also lies in a method of determining the distribution of a first material in a base material, such as the distribution of a drug within organ tissue, comprising the steps of:

(1) labelling the first material with a radioactive substance, (2) exposing the base material to the first material (which may be in the form of a thin slice thereof), in a manner such that take-up of the first material by the base can be expected, and if not in the form of a thin slice removing from the said base material a thin slice thereof after said exposure, (3) coupling the thin slice of exposed base material with a phosphor layer and an image intensifier photocathode input window.

(4) imaging the photocathode output onto a CCD array, (5) establishing a uniform charge pattern on the CCD array at the beginning of each of a succession of exposure periods, at the end of each of which the array is interrogated, and the charge pattern thereon is read out before reinstating the uniform charge pattern, (6) converting the read-out electrical charge patterns into electrical signals indicative of the variation in charge over the array, (7) position-relating the electrical signals to the array, to permit the presence and position of sites of photon activity from the image intensifier (and therefore the position of a radioactive decay events in the sample area) to be identified from the said electrical signals, (8) determining from an analysis of the electrical signals, those which relate to background electrical noise from the photocathode, ion events occurring within the image intensifier and background noise events produced within the CCD array, and excluding therefrom signals relating to all such events, and (9) storing coordinates of points approximating to the center of each site for which electrical signals remain with reference to their position in the CCD array, as the coordinates of points at which radioactive decays have occurred.

The signals derived from the stored central point coordinates may be used to control a visual display device for displaying the points in a two-dimensional display.

The center points determined during each interrogation of the CCD array may be accumulated in an accumulation store and the two-dimensional display is updated from the store on a regular basis so as to indicate all points for which photon activity is attributable to radioactive decays from a given sample.

The invention also lies in the aforesaid method, wherein the said base material is also exposed to a second material labelled with a different radioactive substance, and the presence and distribution of the two differently labelled materials within the said base material is determined by the steps of:

(1) measuring the magnitude of the photon activity related signals from the CCD interrogation which define each site identified as emanating from a radioactive decay, (2) storing in association with the coordinates of the centers of the photon activity sites the measured magnitudes of the photon activity related signals which define the sites, (3) classifying each site by comparing at least one parameter of its photon activity related signal with a look-up table of ranges of possible values for different radioactive materials, (4) storing the classification in accordance with the stored center coordinates of the site, for reading out therewith, Sample and phosphor mounting The fiber optic plate bearing the phosphor coating proposed by the invention may be attached to the input window of an image intensified CCD camera or to an intermediate fiber optic plate (possibly a tapering plate) placed in contact with the sample or alternatively the sample may be mounted thereon and/or it may form part of a large scale array of such fiber optic plates each bearing a sample, for successive presentation to the image intensified CCD camera to enable a high sample throughput to be obtained.

Biological assay analysis

The invention is of particular application in a method of determining the distribution of a first material in a base material, such as the distribution of a drug within organ tissue. To this end the invention includes a method as aforesaid comprising the steps of:

(1) labelling the first material with a radioactive substance, (2) exposing the base material to the first material in a manner such that the take-up of the first material by the base can be expected, (3) after a given period of time, removing from the said base material a thin slice thereof containing whatever labelled first material has been taken up by it in the time, (4) coupling the thin slice of base material with a phosphor layer and the latter with an image intensified CCD camera input window, (5) establishing a uniform charge pattern on the CCD array at the beginning of each of a succession of exposure periods, at the end of each of which the array is interrogated, and the charge pattern thereon is read out before reinstating the uniform charge pattern, (6) converting the read-out electrical charge patterns into electrical signals indicative of the variation in charge over the array, (7) position relating the electrical signals to the array, to permit the presence and position of sites of photon activity from the image intensifier (and therefore the position of a radioactive decay events in the sample area), to be identified from the said electrical signals, (8) determining from an analysis of the electrical signals, those which relate to background electrical noise from the photocathode, ion events occurring within the image intensifier and background noise events produced within the CCD array, and excluding therefrom signals relating to all such events, and (9) storing coordinates of points approximately to the center of each site for which electrical signals remain with reference to their positions in the CCD array, as the coordinates of points at which radioactive decays have occurred.

The signals derived from the stored center point coordinates may be used to control a visual display device for displaying the points in a two-dimensional display.

The center points determined during each interrogation of the CCD array may be accumulated in an accumulation store and the two-dimensional display updated from the store on a regular basis so as to indicate all points for which photon activity is attributable to radioactive decays from a given sample.

Multiple labelling of different materials in a biological assay

As applied to multiple labelling, the invention provides a method wherein a base material such as biological tissue is exposed to first and second materials (eg drugs) individually labelled with two different radioactive substances, and the presence and distribution of the two differently labelled materials within the tissue is determined by the steps of:

(1) measuring the magnitude of the photon activity related signals from the CCD interrogation which defines each site identified as emanating from a radioactive decay, (2) storing in association with the coordinates of the centers of the photon activity sites at least the measured magnitudes of the photon activity related signals which define the sites, (3) classifying each site by comparing its magnitude value with a look-up table of values for different radioactive substances, (4) storing the classification in association with the stored center coordinates of the site, for reading out therewith.

Definition of sub-regions of CCD array

A CCD array comprises a large number of capacitive junctions in which electrical charge is generated therein in the presence of photon energy. The greater the number of photons incident on the capacitive junction the greater the generation in charge. The capacitive junctions are closely packed so that in an area of the order of $1cm^2$, there may be 300,000 pixels uniformly distributed over the area. The CCD array is initialized by ensuring a uniform electrical charge in each of the junctions. The array is then exposed to light and at the end of a given exposure period, the charge generated in each of the junctions is determined by addressing each of the junctions and reading out the charge remaining therein. Various techniques have been developed to address the junctions at high speed so that the time required to read out the signal is very small and by using a so-called dual mode CCD array, the dead-time associated with the read out of the information can be reduced very considerably by blanking half of the junctions and transferring the charge from the other half into the blanked junctions which can then be read out while the original junctions are initialized and exposed once again. In this way relatively high repetition rates can be achieved with little or no dead time.

Unless color discrimination at the CCD is required, the light incident on the CCD array can be thought of as monochromatic and only the luminance content of the image falling on the CCD array needs to be considered. In inverted mode operation of a CCD this can vary from zero photons during the exposure to sufficient photons to completely saturate the junction with charge. These two extremes correspond to black and white saturation and the ability to measure the charge in between those two extremes determines the grey level resolution capability of the CCD array. Typically up to 256 grey levels between black and white can be measured but where low light levels are concerned and the charge reduction even from a relatively bright event will only cause a minimal change in the charge per junction, the 256 grey level slicing may be applied over a smaller dynamic range of charge variation thereby ensuring the same grey level resolution albeit over a smaller range of grey levels, between zero photons and the few photons expected per the event and which are likely to arrive at the CCD array.

Greater or lesser quantization of the charge may of course be utilized, the figure of 256 merely being used as an example.

Resolution in the XY direction is limited to the size and spacing of the junctions and in the limit, the smallest resolvable point is each junction. When displaying a picture by modulating for example a CRT display so that the scanning spot is caused to produce more or less light at each point in the display in dependence upon the quantized charge signal from the CCD for the corresponding points in the CCD array, the resolution in the final display (assuming that the scanning spot size relative to the display area is no larger in proportion than the area of a junction to the overall area of the CCD array) will be limited by the junction size and spacing in the CCD array. Conventionally the points making up the overall CRT display are referred to as pixels and in that event the array junctions can also be thought of as being pixels since there is a one to one relationship. Alternatively groups of junctions may be linked together and read simultaneously so that each pixel in fact corresponds to a group of junctions, not a single junction in the CCD array.

In the following analysis, the term pixel is employed rather than sub-region. It is to be understood that the reference to pixels with reference to the CCD can mean individual junctions in the CCD array or groups of junctions for the reason given above.

If the display resolution is greater than that of the CCD array (eg 1024×768 pixels in the display and 385×288 pixels in the CCD) then the point in the display indicating the position of the centroid of a cluster of pixel values in the CCD, can be displayed to a higher accuracy than would be the case if the same resolution is employed.

Dark level variation and correction

Whether individual junctions or groups of junctions are addressed as pixels, the charge per pixel during read-out of the array (even when the device has not been exposed to any light), will be found to vary from one region of the array to another. This variation is sometimes referred to as dark level variation and is similar to the problem of so-called "shading" in vidicon television cameras.

The variation can be determined at the time of manufacture and a look-up table provided of correcting signals which can be obtained by synchronously reading out the look-up table during subsequent addressing of the CCD array.

The correcting signals may be applied as an offset to the digital values for each pixel during interrogation of the CCD array or may be applied as an offset to a threshold value with which the pixel digital values are to be compared. The net effect is the same.

The dark-level look-up table values can be recalibrated at any time by simply exposing the CCD array to no illumination and reading out the pixel value and replacing the signals in the look-up table with signals derived from the new pixel signals obtained from the recalibration read-out.

Since CCD arrays for use in methods and apparatus embodying the present invention will often be involved with low light levels, dark level correction will be assumed to be provided for the camera.

Cluster identification and centroid labelling algorithms

The algorithms by which events can be identified and distinguished from background noise signals, will now be described in more detail.

For any cluster of pixels belonging to an event identified as described above, we have available from any one interrogation the individual count $q_i$, for each pixel i. The dark level correction for pixel i, namely bi can be read from a dark level look-up table file obtained as described, and a series of acceptance criteria can be applied to the information available from the interrogation assuming a known pixel density on and known size of the CCD.

1. The number of pixels in a cluster N must be between an upper threshold and a lower threshold for the cluster to be accepted as a candidate for consideration as a beta disintegration event. For Tritium, the lower threshold is typically 4 and the upper threshold is typically 120. The upper limit serves the purpose of eliminating from the candidate list, clusters which result from anomalous events such as alpha particles coming from the input fiber-optic faceplate of the image intensifier which interact with the phosphor to produce very large quantities of light. The lower limit serves to remove events arising from phenomena which only affect individual or small numbers of pixels, such as for example events caused by cosmic rays passing through, or from fluctuations in dark-level generation in the silicon of the CCD, or by thermoelectrons, or by ions originating in the image intensifier system.

2. The excess of photon activity descriptive pixel signals above a chosen lower limit, (which may have to be as low as the dark level value for each pixel), can be added for all pixels in a cluster to make a sum S. By requiring S to be greater than a chosen lower limit (typically to that corresponding to several photoelectrons), it may be possible to eliminate clusters due to thermoelectron events and ion events in the image intensifier.

For a low energy isotopes (for example Tritium), there is a problem since here some ion events and genuine beta events have similar S values, and adjustment of the threshold to remove ion events, (ie those remaining after the previous thresholds have been applied) will tend also to remove a significant number of true beta events.

3. In general it has been found that ion events can be eliminated by using the observed fact that such events have a narrower spatial distribution than beta particle disintegration events. To this end a weighted radius for a cluster is computed, defined as $R=\sqrt{(\sigma_x^2+\sigma_y^2)}/\sqrt{2}$, where $\sigma_x$ and $\sigma_y$ are the standard deviations of the $q_i$ weighted projections onto the x and y axes corresponding to the column and row axes of the CCD array, of pixels belonging to the cluster. Ion events can be eliminated substantially by requiring the radius, R, to exceed some size (referred to the camera input) such that cluster candidates are only confirmed as beta disintegration events if for example R is $\geq$ a particular value found by experiment which for one camera was 38 microns.

4. Radioactivity decay instigated clusters can also be distinguished from ion events, by using other shape dependent parameters which quantify departures from a purely gaussian shape (for example skewness or kurtosis). Ion events typically result in a narrow Gaussian shape whereas beta disintegration events tend to have shapes which differ significantly from a Gaussian distribution. Therefore a check on the distribution of a charge pattern of a cluster candidate can determine whether the candidate can be confirmed as an ion event (ie Gaussian) or a beta event (ie non-Gaussian).

It is to be noted that the values of parameters for the cuts described above are dependent on the camera operating conditions, the isotope decay and the choice of phosphor, and these factors need to be taken into account and corrections/modifications made accordingly.

5. Assuming that the upper threshold T1 and lower threshold T2 used to identify clusters, are pixel dependent (from a look-up table) further refinements of the criteria used to recognize or define beta events involve routinely monitoring the camera status (including dark level, temperature and gain) to compensate for any drift in operating conditions and adjusting or regularly updating the values of thresholds applied, to take account of any such drift. Refinements such as these give more accurate and efficient detection of beta events and improve discrimination between clusters which are caused by beta particle disintegration events, and clusters caused by other events, which can be thought of as "background".

6. If a first generation image intensifier is used, it has been found desirable to reduce the image intensifier operating voltage to optimize the use of the thresholds described above for beta discrimination. Such intensifiers can perform stably over a large range of operating voltages. Both the number of ion events occurring and the size of S, associated with any ion events which do occur, fall away very rapidly as the operating voltage is reduced. However the number of beta disintegration event clusters and the cluster radius arising from beta events, remain relatively unchanged so that the size of S, for beta event clusters, falls less rapidly in response to operating voltage drop than does the corresponding sum (S) for ion initiated events.

7. Cluster candidates may be analyzed to see if any arises from two or more overlapping clusters and if so, the separable clusters are stored and independently classified.

8. Parameters to be measured and values to be checked to enable identification and classification may be determined by subjecting a known phosphor image intensifier CCD camera combination to known events and determining the values of different parameters of the signals making up the clusters resulting in the CCD output.

Multi Labelling

In a further refinement the procedures for cluster finding by choice of threshold and cluster selection by parameters can be adapted to permit analysis of samples labelled with different radio isotopes (Multi-labelling or dual-labelling). Separate images and lists of the events can be produced pertaining to each separate radio isotope, or the differently identified isotope events labelled accordingly in any listing produced, and displayed in different colors in a single display.

Display of sample image

To assist in analysis of the beta mapping, the invention not only provides the step of displaying on a visual display device the radioactive decay instigated event positions for which coordinates are stored, but also the step of causing to be displayed in correct registry with these points an image of the sample from which the radioactivity has been detected, to enable the regions in the sample from which radioactivity is arising readily to be seen.

The image of the sample may be displayed as an outline or as a background, and the picture content in the display corresponding to the coordinate defined positions preferably takes precedence over the picture content of the image of the sample.

Features of apparatus embodying the invention

Apparatus for performing the method first described conveniently comprises:

(1) means for addressing separately addressable sub-regions of the CCD array, (2) charge reading means adapted to investigate the charge in each sub-region during each interrogation of the CCD array and produce an electrical signal indicative of the photon emission activity to which each sub-region has been exposed during the preceding exposure period, (3) signal processing means adapted to identify clusters of electrical signals indicating that light has influenced the charge on a plurality of immediately adjacent sub-regions during the preceding exposure period, (4) further circuit means adapted to determine the coordinates at the center of each identified cluster of adjacent sub-regions, (5) memory means for storing signals relating to the center of each cluster of sub-regions, and (6) memory addressing means to read out from said memory means the coordinates of the centers of the identified cluster.

Apparatus as aforesaid may also include a scanning display system to which signals from the memory addressing means can be supplied in synchronism with the scanning so as to produce in the display visually distinctive points at positions defined by the stored coordinate values corresponding to the positions at which light has impinged on the CCD array of the camera during the preceding exposure period. By updating the display on a regular basis, with information from subsequent memory addressing, a picture can be generated in the display indicating radioactive disintegrations as they occur together with those which have already occurred.

The invention also lies in apparatus for detecting the presence and position of disintegrating radioactive material in a sample, comprising:

(1) CCD camera means and image intensifier means, the output of the latter providing the input to the CCD camera, (2) sample support means for the radio isotope labelled sample, (3) a phosphor film in contact with the radio isotope labelled sample and adapted to emit photons in response to radioactive decays of the radioactive material within the sample, each decay comprising an event, (4) means for repetitively scanning the CCD array of the CCD camera, each scan corresponding to an interrogation of the array and being followed by a resetting step and preceded by an exposure step, (5) means for generating from the scanning a data signal corresponding to the charge pattern found during each said interrogation of the CCD array, (6) signal processing means and computing means to which the said data signals are supplied after each interrogation, and adapted to perform measurements thereon to identify any cluster of immediately adjacent data values each of which is indicative that light emitted by the image intensifier has been incident on immediately adjacent separately addressable regions of the CCD during the exposure period immediately preceding the interrogation, (7) means for computing from the data signals of each identified cluster the x, y coordinates of a center of the cluster, with reference to the scanned CCD array, and (8) memory means for storing at least the center coordinates of each identified cluster together with at least the center coordinates of any other clusters identified during the same interrogation of the CCD array.

Apparatus according to the invention further comprises means for reading out the data in the memory and producing a list of the center coordinates stored therein.

Apparatus according to the invention also comprises a visual display system responsive to signals read out from the memory means thereby to reproduce in the visual display a reproduction of the scanned area of the CCD array the signals read out from the memory means serving to modulate the visual display so as to generate visually distinctive features in the display at positions defined by the coordinates stored in the center memory.

The invention also lies in apparatus as aforesaid wherein the phosphor is supported on a thin film which is in contact with the input window photocathode of the image intensifier.

The sample to be analyzed is preferably positioned in contact with the phosphor. Typically phosphors are P20 (Zinc cadmium sulphide: silver) and P47 (Yttrium silicate: cerium).

Preferably the image intensifier has a bi-alkali material cathode and the CCD is adapted to operate in so-called inverted mode thereby to reduce contributions in its output signal due to fluctuations in thermal noise in the CCD array at room temperatures.

The invention also lies in apparatus, as aforesaid further comprising an addressable memory within which information is stored corresponding to the outline and detail of the sample and memory addressing means for reading out from the said memory signals in synchronism with a scanning display device, the signals read out from the memory being supplied to the scanning display device, to produce in the display an image of the sample from which the radioactivity has been detected by the CCD camera in combination with and superimposed thereon visually distinctive points corresponding in position to the coordinates stored in the first mentioned memory so that the superimposed points are in correct registry with the image of the sample from which the radioactivity has been detected to enable the regions of the sample from which radioactivity has arisen readily to be seen.

SUMMARY OF THE MAIN FEATURES OF METHODS AND APPARATUS EMBODYING THE INVENTION

The invention provides a method of imaging beta particle disintegration radiation of high and low energy (from $^3$H 0–18keV to $^{32}$P 0–1700keV and above), emitted by a radioisotope labelled sample. Both low and high event rates (typically from 0.01ev/s to 1000 ev/s) from the same sample can be handled in real time in continuous operation. The active area of the sample may be of the order of 1cm$^2$. Algorithms are applied to the image data to distinguish beta particle disintegration events occurring during a given frame from one another and from noise and non-beta disintegration events, and the position and event rate data is stored to allow a mapping of the events over the sample which may be displayed.

The mapping and display may relate to a single frame exposure of the CCD or from data accumulated from a succession of exposures. Each exposure is followed by an interrogation of the CCD array and together make up a single frame which, if the process is repetitive, together make up a sequence of frames which is thought of as a video signal.

Rapidly occurring disintegrations (high event rates) can be handled if a continuously operating CCD camera is used having a suitable frame rate typically in the range 1–100 Hz and by providing circuits which can resolve many events (typically up to 1000) during any given frame, in real time. It thereby avoids the use of the event triggering strategy characteristic of the prior art, with the consequent dead times (typically of the order of 10ms) which severely limits the event rate handling capability of the prior art apparatus (typically to event rates of the order of 10 ev/s) and therefore the sample area can be imaged and the sample strength.

CCD noise is not a problem since each frame is analyzed in turn and signals from previous frames, which would integrate over a period of time in the CCD, are prevented from doing so by re-initializing the CCD prior to each exposure and interrogation.

Ion release within an image intensifier is potentially a serious source of background "events" signals from which radioactive decay instigated events must be distinguished, particularly in the case of first generation image intensifiers. Real time algorithms have therefore been proposed to identify radioactive decay instigated events. These algorithms are based on a number of measured parameters typically the total charge on the CCD attributable to each event and the spatial spread of the charge relating to the event as expressed by the number of contiguous pixels affected by the event. This spread may be expressed as a second order moment of the cluster about the centroid thereof, of the charge weighted sub-regions. The algorithm can label an event as a radioactive decay, making up the cluster event, an ion event or shot noise.

The position of radioactive decay events in the sample can be computed as the centroid of the charge distributions on the CCD array relating to the events, and accuracies involving an uncertainty of only 10 microns are achievable with reference to input faceplate of the camera.

If the event energies are strong, a lens system can be used to image the sample onto the photocathode of an image intensifier and thereby view a large area of sample (or even a number of separate samples) by demagnification. For samples emitting only weak event energies, it may be necessary for the sample and phosphor to be in contact with the fiber optic entrance window of the image intensifier.

A fiber optic taper may he used either as or in contact with the faceplate of the imaging system, in which the tapered area corresponds to the area of the photocathode faceplate of the entrance window and the larger area at the input end of the taper corresponds to the area of the sample.

Samples to which the invention may be applied comprise
1. histological sections of tissue such as animal or plant tissue.
2. high density arrays of oligonuclides, peptides, DNA, proteins, carbohydrates or polysaccharides where the object is the detection of specific target biomolecules in such arrays.
3. identification of biomolecules using electrophoretic separation techniques or chromatography where the imaging- system is to be used to measure patterns of separated biomolecules, including miniaturized patterns and labelled probes such as nucleic acids or antibodies labelled with for example $^{32}P$, or $^{125}I$.
4. viable (growing) cells—adhered onto petri dishes or microscope slides for example cellular monolayers, cell cultures and tissue cultures.

Example 3 is particularly important since the invention allows for the first time miniature high density patterns of separated biomolecules to he addressed.

Radio-isotopes which may be used for labelling comprise the following:

| tritium | ($^3H$) |
| carbon 14 | ($^{14}C$) |
| sulphur 35 | ($^{35}S$) |
| iodine 125 | ($^{125}I$) |
| phosphorus 32 or 33 | ($^{32}P$ or $^{33}P$) |
| chromium 51 | ($^{52}Cr$) |

The latter comprises a gamma ray emitter and may be used to label cells.

Labelling

This may be achieved in a number of different ways:
1. a drug may be administered to an animal after which a distribution of the drug in the animal is looked for, for example in brain or liver tissue obtained following biopsy or autopsy.
2. a section of tissue or organ is cut to give a thin section of thickness of the order of 10 to 20 microns and the thin section is exposed or incubated with a label or label ligand for example probe or drug for example identification of receptors in cells.
3. in-situ hybridization techniques may be used where labelled nucleic acid probes are hybridized to the tissue section (as in 2 above). Labelling may for example be achieved using Carbon 14 or Tritium.
4. the uptake and distribution of labelled material may be measured. For example the uptake of drugs or other biomolecules into cells or organelles within a cell in samples such as tissue sections or cellular monolayers so as to identify the action or cell function for example neurotransmitter in the brain.
5. immunobinding techniques may be used where antibodies labelled for example with Carbon 14 or Tritium are used to probe for example antigenic sites in tissue sections or cells.
6. toxicological studies to identify the effect of toxic agents or biomolecules on cell function, for example use of chemical agents on samples of tissue sections or cellular monolayers or cell cultures. An example is the use of cosmetics or compounds in cosmetics on a section of, for example, skin tissue, where the labelled Carbon 14 or Tritium compound or chemical agent is identified to determine the distribution of binding of the compound and the specific areas or cells into which the compound is taken up.
7. dual-labelling techniques may he used where more than one label is to be employed to identify more than one specific target molecule in a given sample. The imaging technique may be used to measure the location of more than one label in the same sample.

The invention will now be described by way of example with reference to the accompanying drawings in which:

FIG. 1(a) is a block schematic diagram of apparatus embodying the invention for detecting radioactive isotope disintegrations in the sample.

FIG. 1(b) is a block schematic diagram of another embodiment of the invention.

FIG. 2 is a block schematic diagram of a signal processing system for processing signals from the CCD camera of FIG. 1(a) or FIG. 1(b).

FIG. 3(a) indicates the logic decision making hierarchy and algorithms of the processing system of FIG. 2.

FIG. 3(b) is an elaboration of the processing logic of FIG. 3(a).

FIG. 3(c) illustrates in a three dimensional representation the photon relating activity and resulting charge patterns to be found on the CCD array for different typical events.

FIG. 4 is a modification of the system shown in FIG. 2 for higher speed data processing.

FIG. 5 is a block schematic logic diagram illustrating how the different values $r^{cent}$, $c^{cent}$, S and N are computed for all pixels in the range 1, 2 . . . N.

FIG. 6 is a similar schematic logic diagram indicating how a second order moment R can be calculated once the values of $r^{cent}$, $c^{cent}$, S and N are known, again on the assumption that a DSP is under software control and is simply forming a series of simple arithmetic functions.

FIGS. 7(a), 7(b) and 7(c) show three preferred combinations of sample, phosphor screen and image intensifier.

FIG. 8 shows how a system can be automated for measuring several samples, and

FIG. 9 illustrates graphically a typical distribution of "counts" associated with one pixel in a CCD array, for different events, and FIG. 10 shows the distributions of two different radioactive energies which could be formed from pixel charge measurements from a dual labelled assay.

Figure 1A:
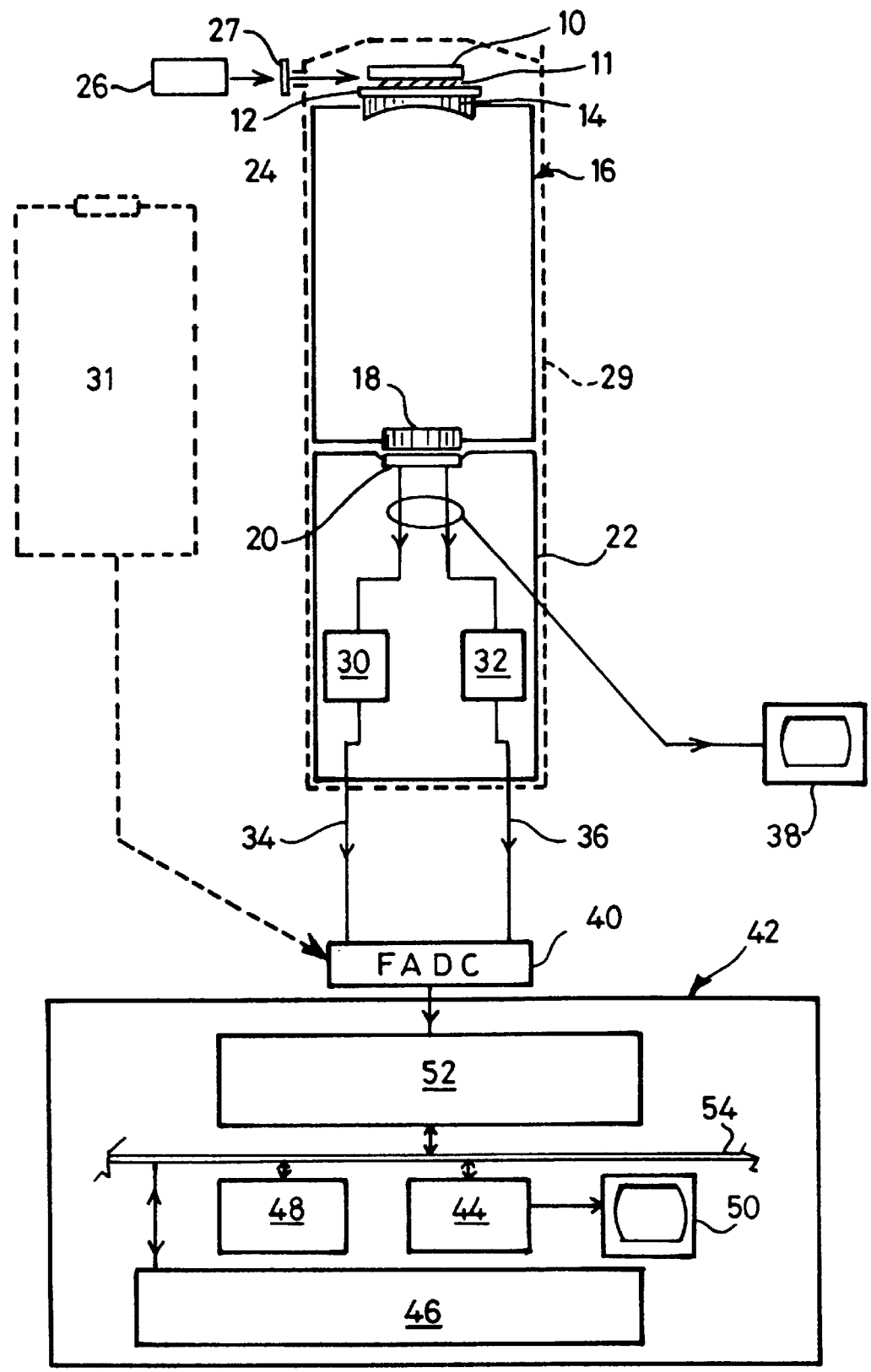
In FIGS. 1(a) and b apparatus is shown for detecting radioactive beta particle disintegrations in a radio isotope labelled sample. Typically the sample will be carried by a glass microscope slide or the like shown at 10 and shown to a much larger scale in terms of thickness is the sample at 11. The slide 10 is placed face down so that the sample 11 is in contact with a phosphor layer 12 again shown magnified in cross-sectional thickness at which is carried by the input window 14 of an image intensifier 16 or by a thin film (not shown) or fiber optic plate (not shown) which is placed in contact with the input window 14.

The image intensified representation of the light incident on the window 14 appears at output windows 18 and is transferred to a CCD array 20 of a CCD camera generally designated 22.

The photocathode of the image intensifier shown at 24 is preferably formed from low noise material and is preferably a bi-alkaline material.

In order to provide for an optical image of the sample to be presented to the CCD array 20, a light source 26 may be positioned to illuminate the edge of the sample and phosphor combination and to render the image intensifier 16 less sensitive during such illumination, the operating voltage of the image intensifier is reduced by adjustment of a variable voltage source 28.

Since only a relatively low light level is required, a 'BETA-LIGHT' (R.T.M) source may be used for the light source 26 and although not shown diffusing and attenuating filters may he used between the light source and the sample. Furthermore although not shown, means for adjusting the position of the light source 26 and the angle of the beam of light between it and the sample, may be provided.

If a 'BETA-LIGHT' (R.T.M) source is employed, a shutter 27 is provided to prevent light from reaching the sample except when required during edge illumination for optimal imaging of the sample.

The light source 26 is typically contained within a housing which forms a hood over the end of the image intensifier input so as to restrict the entry of light or other radiation which otherwise could affect the operation of the image intensifier. When used to detect light from the phosphor caused by beta events, the operating voltage provided by source 28 is increased to a higher value so that the gain of the intensifier is increased.

If the sample 11 is of sufficient contrast or is stained, and the support 10 is itself transparent or at least translucent, then a light source can be located above the support 10 instead of in line with the edge of the sample as shown.

Typically the image intensifier and CCD camera are formed as a unitary assembly and comprise "an image-intensified camera" and to this end the two items are shown joined by the dashed line 29.

Where the sample can only be visually distinguished by the camera using reflected light using for example polarized light, it may be necessary to provide a second CCD camera 31 which is movable into position in place of the image intensified camera 16/22 so as to image the sample and provide an output signal for storage and display as will be described later in relation to FIG. 2. In this event it is anticipated the cameras 31 and 16/22 would be mounted so as to be readily substituted one for the other to allow an image of the sample to be obtained using camera 31 and sample radioactivity detected by the image intensifier camera 16/22.

The CCD array 20 is controlled in known manner by addressing electronics 30 and the signal read out by the addressing of the array during each interrogation cycle of the CCD camera, is amplified by amplifier 32. Outputs from the camera are provided along lines 34 and 36, the video output signals being supplied along line 34 and synchronizing (clock) signals along line 36.

An oscilloscope or other visual display device 38 is provided to enable the video output signal from the CCD camera to be displayed before any processing occurs, and to assist in setting up and checking the operation of the equipment.

The signal along line 34 is assumed to be an analogue signal and to this end a fast analogue to digital converter (FADC) 40 is provided so as to provide a digitized video signal for supply to a computer 42 which may for example comprise a standard personal computer containing a host processor 44, a host memory 46, a large capacity hard disc drive 48 and associated visual display unit or monitor 50. The processing power of the PC can be augmented by using a preprocessor/video compression board generally designated 52 so that a processed signal is supplied to the PC bus 54 instead of the signal from FADC 40.

The provision of additional processing power ahead of the bus 54 is of considerable importance if the speed of data transfer via the bus 54 is inadequate to allow real time processing at high frame rates of the CCD, ie if the interrogation of the CCD occurs at intervals of time which are insufficiently spaced apart to allow transfer of the data from each read-out of the CCD to the PC before the next frame of data begins to arrive. In that event one function of the processors 52 is to compress or compact the data before it is applied to the computer bus 54.

Figure 1B:
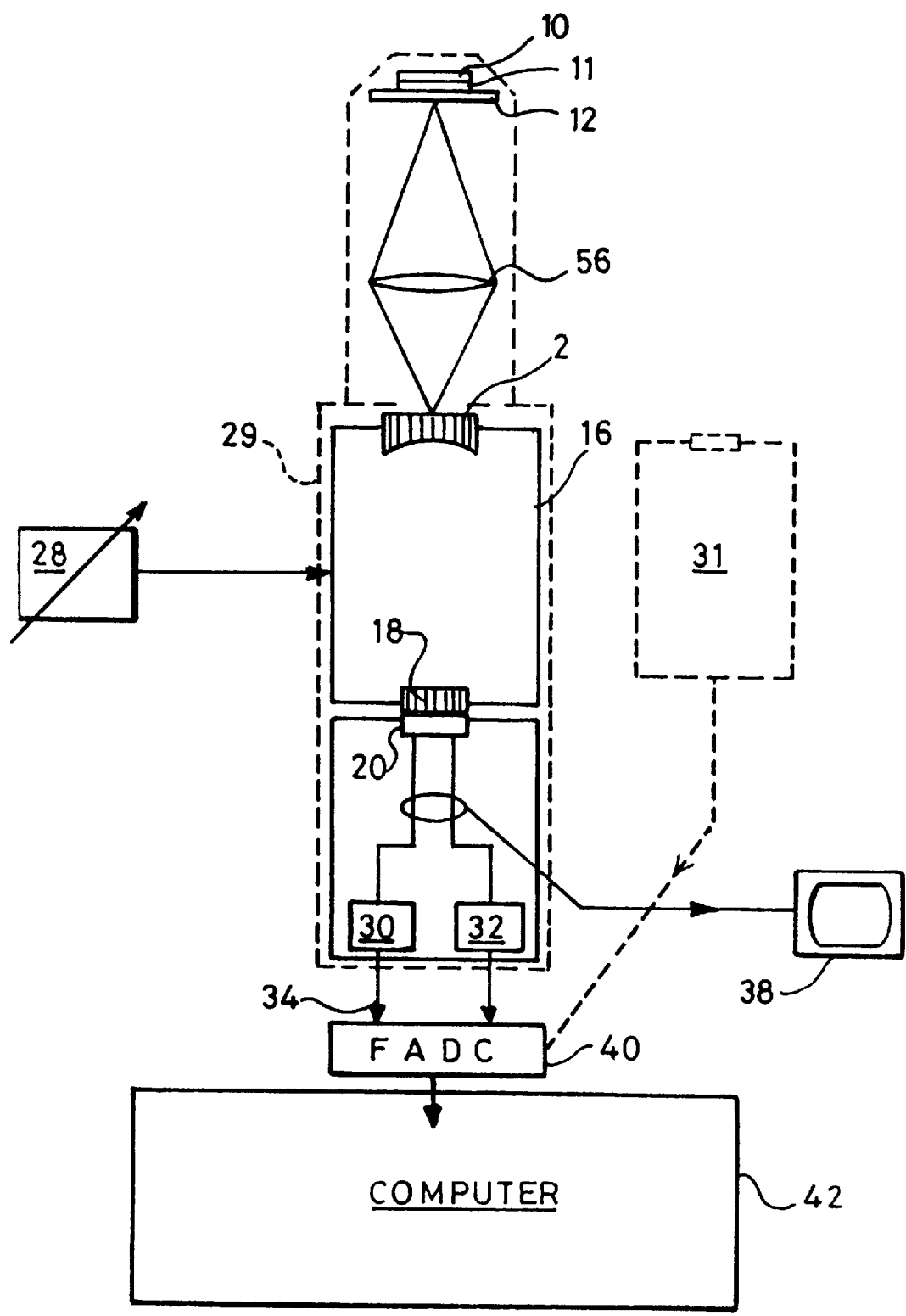

The arrangement shown in Figure 1a is particularly suited to samples labelled with low energy radio isotope material, in which very little energy is available from each beta particle disintegration. Minimal loss of energy from each such disintegration is ensured if the phosphor is in intimate contact with the sample.

Where very low energy radio isotope material is employed, the resulting energization of the phosphor will be equally small and the light available from the phosphor from each beta particle disintegration of such materials is therefore very small. To this end it is important for the phosphor to be in intimate contact with the photocathode entry window 24 of the image intensifier 16.

Where higher energy radio isotope material can be used, an alternative imaging arrangement such as is shown in FIG. 1b can be employed in which the sample 10 is carried by a microscope slide 10, or the like, in contact with a phosphor 12 typically carried by a thin film, and a lens 56 is provided for imaging light from the phosphor onto the input window 24 of the image intensifier photocathode.

The rest of the system shown in FIG. 1b is essentially the same as that shown in FIG. 1A and the same reference numerals have been used to denote features common to the two systems.

DETAIL OF DATA PROCESSING COMPUTER

Figure 2:
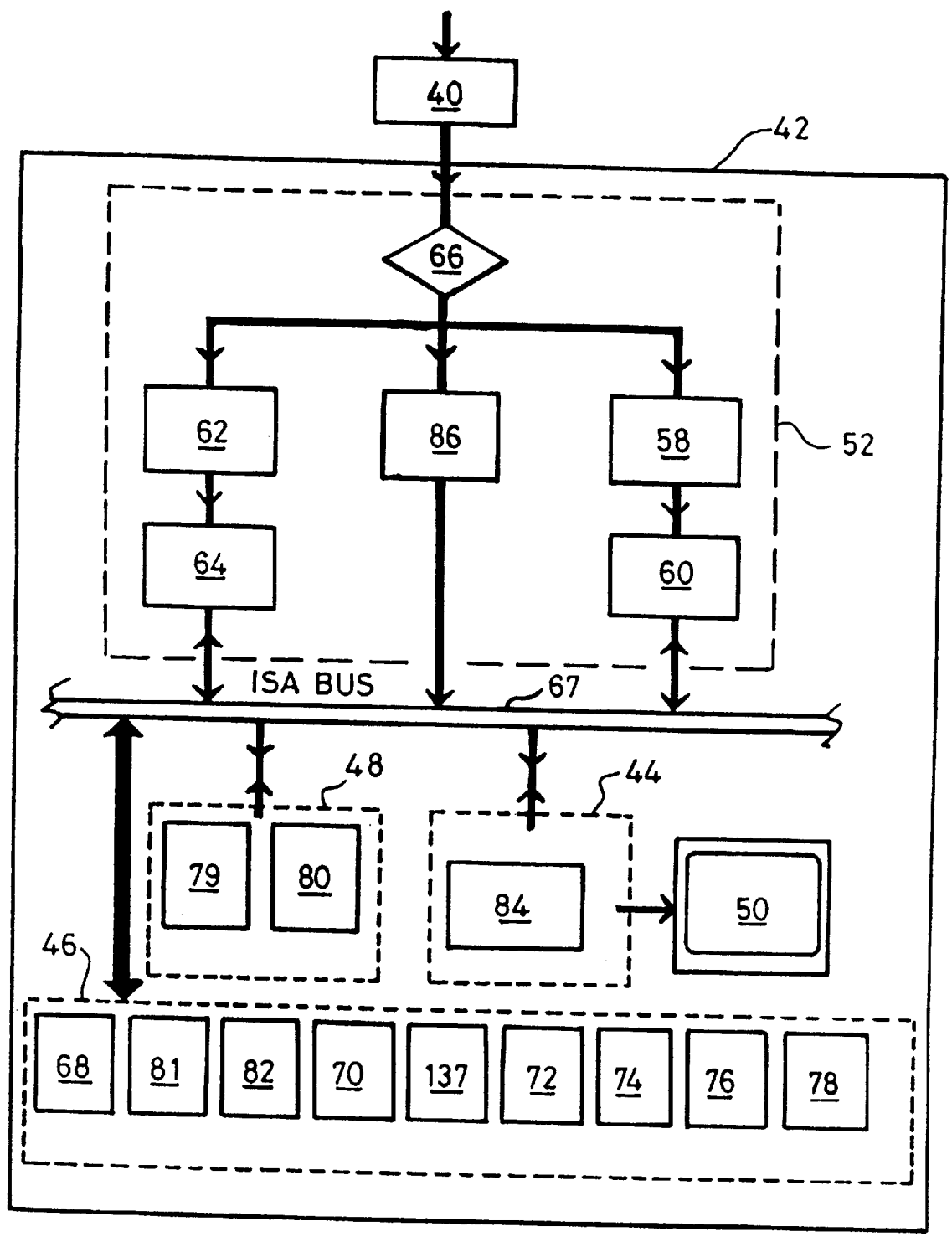

FIG. 2 is a block schematic diagram of the computing and data processing unit 42 of FIG. 1a and 1b typically based on a IBM compatible personal computer containing a type 486 processor 44 and 8 megabytes of RAM 46. The host hard disk 48 should be of the order of 320 megabytes capacity. The visual display unit is preferably an SVGA display.

The host memory 46 is divided into different sections for storing data produced by the camera, and the subsequent processing thereof, but the hard disk 48 is organized as the final storage device for the list of detected event coordinates, and as a long term store of the data used to reconstruct the image of the sample in the SVGA display 50 obtained from a preliminary imaging step as already described or from an alternative camera such as 31.

One of the expansion slots of the computer is fitted with a special purpose video processing board 52 previously identified as containing the dedicated processors for compactifying or compressing the data from the FADC 40 and thresholding to achieve noise reduction.

Although shown as mounted separate therefrom, the analogue to digital converter 40 may be incorporated on the board 52. A suitable device to serve as the FADC 40 is the twelve bit analogue to digital converter produced by Analogue Devices under the code AD 1671KQ.

On the card there are mounted two processing paths in order to achieve higher operating speed than if only one is used. To this end one path comprises processor 58 and associated frame buffer 60 and the other a processor 62 and associated frame buffer 64. Additional similar parts may be employed if even higher operating speeds are required.

The increase in operating speed is achieved by providing a switch 66 which operates in synchronism with the interrogation of the CCD and diverts the digitized video signal arising from successive interrogations of the CCD array alternately to the processors 58 62. Processors 58 and 62 perform identical functions on incoming data and each is typically a Texas Instruments type DSP TMS 320C50.

The function of each processor is to compact or compress the data supplied to it via the switch 66. The latter typically comprises a gate array type XILINX XC3030.

Noise reduction and a first level of compression of the incoming data is achieved by each processor 58, 62 by rejecting data values (and their corresponding addresses) which are less than a threshold T3. The data values (and corresponding addresses) which do pass the T3 threshold test are stored in the frame buffer 60 or 64 respectively and typically each comprises a fast static random access memory (SRAM) such as that supplied by Micron under type No. MT5C1008.

During alternate CCD frame periods, (i.e. exposure followed by interrogation) data is supplied by the FADC 40 and switch 66 to the DSP 58 which applies the programmed algorithm to the data in real time so that the processed signal is available for immediate transfer to the associated frame buffer 60 during the frame period, so that at the end of the frame period, DSP 58 is in a position to transfer the processed data in the frame buffer 60 via the ISA computer bus 67 to a frame store 68 in the host memory 46.

Typically the data transfer is effected by direct memory addressing (DMA) across the ISA bus 67.

Since the time for this data to be transferred is not inconsiderable and the processor cannot handle signals from the next frame until it has transferred all the data into the frame store 68, the data from the other set of alternate frames is directed to the other processor 62 by appropriate operation of switch 66. Operation of DSP 62 and the frame buffer 64 is similar to that of 58 and 60 and it will be seen that the whole of each frame period is available to one or other of the processors to either process incoming data or transfer processed data into the frame store 68. Each transfer replaces the data previously stored by the other processor. Thus whilst one processor such as 58 is transferring data from its frame buffer, switch 66 diverts incoming digitized data from FADC 40 to the other processor and during the next frame period, the process is reversed by operation of switch 66 so that the incoming data is now supplied to the other processor whilst the first processor transfers the processed data in its relevant frame buffer to the frame store 68.

Provided the number of separate addresses and data values greater than T3 is less than 50 % of all the possible addresses making up each frame, the T3 thresholding algorithm will reduce the volume of data per frame. The frame rate is then dictated by the time needed to transfer this reduced volume of data from the relevant frame buffers 60 and 64 into the frame store 68.

The compression/compactification function performed by the DSP's 58 and 62 is necessary if (as is usual) the data transfer rate of the host processor I/0 bus 66 is insufficient to permit video signal data from FADC 40 to be transferred fast enough to permit useful frame repetition rates of the CCD to be achieved. If the host processor I/0 bus data transfer rate is high enough, then the special input card allowing data compactification may not be required.

Provided the field does not contain too many events, further data compression can be obtained by omitting from the data to be transferred the addresses of immediately consecutive pixels which satisfy the threshold T3. Where the data is in a sequence of address, data, address, data etc. the following logic will allow this further compression:
  (1) at the start of each CCD frame, set the current pixel address to zero,
  (2) if the next word is data, store that data to that address and add one to the current address,
  (3) if the next word is an address, set the current address to this new address and get the next item,
  (4) if the retrieved item is data, store this at the current address and update the current address by one,
  (5) if the next item is a new address, then set the current address to this new address and repeat from step 3, until the end of the frame is seen.

The scheme described requires a means of identifying each data item as either an address or data value. An otherwise unused bit in each data item can be used for this purpose.

Figure 3:
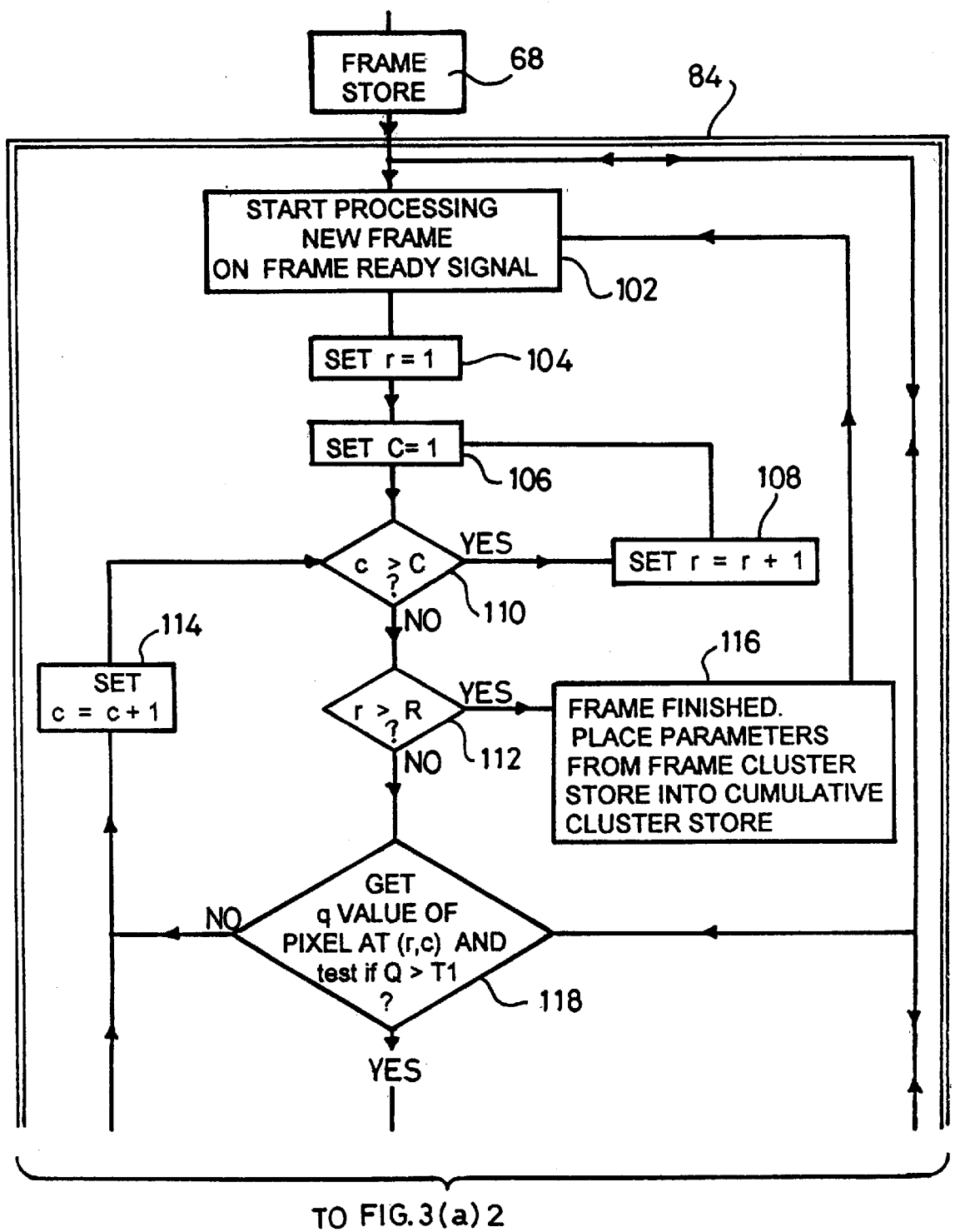

The host processor 44 is programmed to operate in a plurality of different modes, one of which is to identify clusters of data values which are greater than T3 (and their corresponding addresses), and the precise data processing route followed by the processor to achieve that identification is described in more detail with reference to FIGS. 3(*a*) and 3(*b*). The cluster finding operation requires a number of working data stores to be associated with the host processor. The host RAM is therefore organized to provide not only the frame store 68, into which the incoming data values and addresses are stored, but also a cluster pixel store 70, a cluster store 72 in which the computed coordinates of the cluster centers are stored, a threshold store 74, a frame cluster store 76 and a multi-cluster pixel store 78, the function of each of which will be described as the algorithms are described in more detail later. Suffice to say, the coordinates which end up in the cluster store 72 at the end of each frame are transferred to a cumulative cluster store 80 on the hard disc 48. The coordinates may be stored in database format or simply as a list in the cumulative cluster store 80.

The processor 44 is arranged to drive the SVGA display 50 so as to produce thereon an image of all the events for which coordinates are stored in the cumulative cluster store 80 in registry with an image of the sample as seen by the camera. To this end the host processor 44 is adapted to transfer the data which has previously been stored on the hard disc in frame store 79 and which relates to at least the sample outline, to a screen store 81 which forms part of the RAM 46 and to transfer the coordinates stored in the cumulative cluster store 80 on the hard disc to a second screen store 82 comprising yet another part of the RAM 46. Synchronous high speed repetitive addressing of stores 81 and 82 enables a video signal to be formed for controlling the SVGA display 50 and providing therein the desired display of the events superimposed on the outline of the sample.

It is to be understood that the data relating to the sample outline need not be derived from only one interrogation of the CCD array but advantageously may be derived from a succession of such interrogations whilst the sample is suitably illuminated as by the light source 26. Since little or no processing of the data arising during these interrogations is required, a direct link from the switch 66 to the ISA bus 67, via a buffer amplifier 86, may be provided on the video input board 52. The processor 44 is programmed to instigate the direct link during the appropriate interrogations of the CCD array and to direct the data via the ISA bus to the hard disc from where it can be read into the screen store 81 when required.

When a sample is replaced with the next sample, the sample image data on the hard disc has to be overwritten by a subsequent imaging of the new sample via the CCD camera. The first sample can be saved elsewhere on the hard disk as required.

The events determined by the coordinates in the cluster store 72 and repetitively read out from store 82 are displayed in a contrasting color or manner in the display 50. By updating the store 82 on a regular basis, an indication of all the beta radioactive decays which occur since the beginning of an evaluation of a sample can be displayed in real time.

Figure 3A:
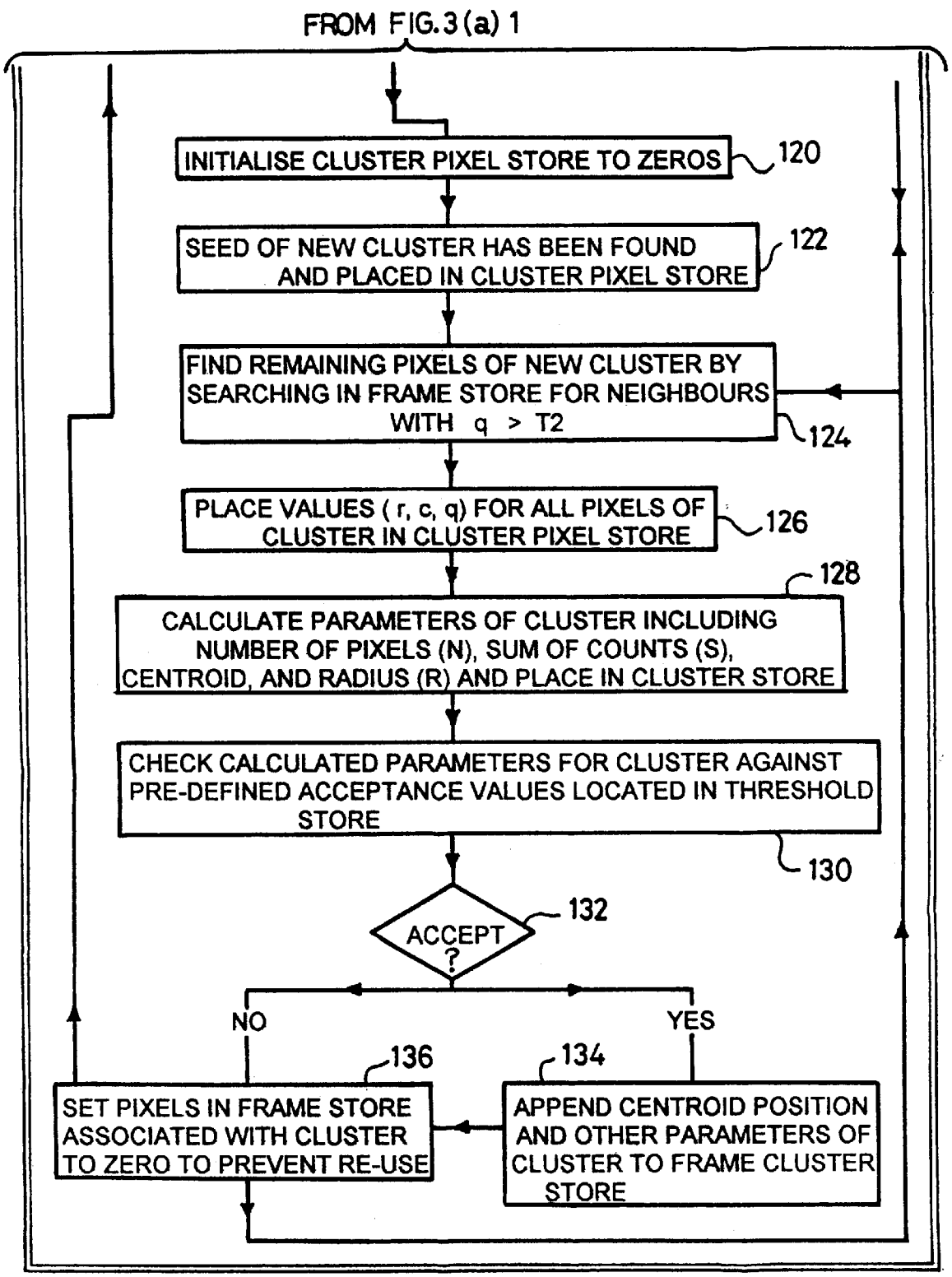

The programming of the host processor 44 to perform the cluster finding function (designated 84 in FIG. 2) can best be understood by studying the logic flow chart of FIG. 3a.

This function is to find and analyze clusters of data values which satisfy certain threshold criteria and for the purpose of this analysis it is helpful to consider the relationship between the CCD array and the digital data values descriptive of the charge pattern on the array after exposure to light.

It the charge from each separately addressable light sensitive region in the array is digitized, and each such region is mapped on a one to one basis with corresponding regions in a display device, and the light produced by each region in the latter is controlled by the digital value associated with the corresponding region in the CCD array, then the smallest resolvable point in the display (normally referred to as a pixel) corresponds to the separately addressable regions mapped into it from the CCD array. Each separately addressable region of the CCD camera can therefore be thought of as a pixel.

The same reasoning applies whether or not the CCD array is addressed in a manner so as to produce a sequence of digital values or produces an analogue value which is then digitized by means of an A to D converter operating synchronously so as to digitize the analogue signal values as if each was arising from an addressing of the corresponding point in the display.

The value of q (the digitized value of the charge at each pixel) is obtained by the analogue to digital converter 40. This operates so as to convert the charge related voltage signal obtained during interrogation of the CCD array into a series of digital values one for each pixel and if a 12 bit analogue to digital converter is used, the saturation charge in each pixel will be given a value of 4095 and intermediate values of q less than saturation, a value in the range 0 to 4095.

The process for cluster finding begins at box 102 on receipt of a frame ready signal. Control first passes to box 104 and then to 106 where the row address r and the column address c are each set to 1 so as to address the first pixel of the frame.

Stepwise investigation of the pixels in the frame

The boxes marked 104, 106, 108, 110, 112 and 114 show how r and c are incremented to allow each pixel in turn in the frame to be examined. As each pixel is processed, control arrives at box 114, where the column address c is incremented by 1. The value of c is tested in box 110 and if c is less than or equal to the maximum value allowed (namely value C), processing continues in box 112. If c exceeds C. control passes to box 108 where the row address r, is incremented by 1 and the column address is reset to 1 (box 106).

Control now returns to box 110 and from there to box 112 where the row address r is tested against the maximum row address value R. If r exceeds R, it means that the last of the pixels in the CCD array has been seen and all the pixels in the CCD frame have been tested.

Box 116 temporarily takes over at this point to perform a transfer of data to the accumulation cluster store 80 (to be described). Control then returns to box 102 to await the frame ready signal indicating the beginning of the next frame when the process is repeated.

Thus all valid r and c combinations in turn reach box 118 where for each identified pixel, the associated digital pixel charge value, q, is compared with a threshold T1 stored in a threshold store 74.

If q is below T1, control temporarily returns to box 114 so that the next pixel address can be generated and the next pixel q value can be determined.

If the q of the identified pixel exceeds T1, control instead passes to box 120 which causes a new cluster to be started in the cluster pixel store 70.

The r, c and q values for the identified pixel (which becomes the seed pixel of the new cluster) are passed to box 122 which now assumes control.

Using the values of r, c and q in 122, box 124 now attempts to build a cluster around this seed pixel. Starting with this seed pixel, the building algorithm checks for any pixels adjacent the seed pixel which have q values exceeding a second (lower) threshold T2 and which are thus deemed to form part of the new cluster. The algorithm proceeds by continuing to add to the cluster the r and c values of all immediate neighbors of both the seed and any pixels already identified as belonging to the cluster, until no immediate neighboring pixel is found having a q value that exceed T2. During this process the action of box 126 is to assemble in the cluster pixel store 70 the r, c and q values of all of the pixels which make up the cluster.

When the end of the cluster is reached, box 128 computes certain parameters for each cluster, including the number of pixels (N), the sum of the counts (S) the centroid of the cluster and the radius (R), of the charge weighted distribution of the pixels in the cluster by using the r, c, q values of all the relevant pixels in the cluster store 70.

A number of pixels (N) is calculated by simply counting the number of different r, c coordinates entered in the cluster pixel store.

The sum of the counts (S) is calculated by adding the q values of the same pixels.

The cluster centroid coordinates ($r^{cent}$, $r^{cent}$) are calculated using the following equations:

$$r^{cent} = \sum_{i=1}^{N} r_i q_i \sum_{i=1}^{N} q_i \quad c^{cent} = \sum_{i=1}^{N} c_i q_i \sum_{i=1}^{N} q_i$$

The computed cluster centroid coordinates ($r^{cent}$, $r^{cent}$) are placed in the cluster store 72. The value used in these formulea will normally have been corrected for dark level variation, as by having the appropriate dark level value $b_i$ subtracted first.

In these equations the index i, of pixels to be summed, takes the values 1,2,3 etc up to N, where N is the total number of pixels in the cluster. Thus ($r_i$, $c_i$, $q_i$) refer to the row address, column address and pixel "count" value for the ith pixel in the cluster. It is important to note that whereas r and c are integer values in the range 1 to R and 1 to C respectively, and are defined by the structure of the CCD, (ie the number of separately addressable regions in the array), $r^{cent}$ and $c^{cent}$ are floating point values not limited to integer values. Hence the centroid position can be computed to sub-pixel accuracy.

Another cluster parameter to be calculated is the cluster radius R which is a measure of the area and charge area of the cluster and is computed in two stages. Firstly the product of the q value for each pixel and the square of the r and c projections of the distance of each pixel in the cluster from the centroid, is computed, and each is summed for all pixels in the cluster and normalized by dividing the sum by the sum of the counts (S) for the cluster. This gives $\sigma_y^2$ in the case of the r projections, and $\sigma_x^2$ in the case of the c projections. The effective radius R is computed using the following equation: $R = \sqrt{(\sigma_x^2 \sigma_y^2)}$, where the values of $\sigma_x^2$ $\sigma_y^2$ are calculated using the following equations:

$$\sigma_y^2 = \sum_{l=1}^{N} q_l(r_l - r^{cent})^2 / \sum_{l=1}^{N} q_l$$

$$\sigma_x^2 = \sum_{l=1}^{N} q_l(c_l - c^{cent})^2 / \sum_{l=1}^{N} q_l$$

The resulting value of R namely the cluster "radius", is placed in the cluster store 72 in association with the other parameter values for the cluster.

Box 130 compares the parameter values in the cluster store 72 with predefined acceptance values for these parameters held in the threshold store 74. A cluster will be rejected if the number of pixels N is too small or too big, or if the calculated radius R is too small or too big. The acceptance values can be selected so as to remove the (r,c) coordinates of events whose R and/or N values identify them as for example arising from thermoelectric activity from the photocathode, or an ion event from the image intensifier, but retain the (r,c) coordinates of events caused by beta decays in the sample.

Box 132 determines the overall result of the comparison tests in 130 and passes control onto box 134 if it is determined that the cluster should be accepted, or to box 136 if the cluster is to be rejected.

Box 134 places the contents of the cluster store into the frame cluster store 76 which serves to record the parameters of all the clusters identified as "beta event clusters", found during one particular frame.

Box 136 sets to zero the digital pixel count values, q, associated with all the pixels belonging to the "beta event cluster" just processed, so as to prevent any pixel that has been linked to one cluster being identified as a seed pixel thereby instigating a false cluster during a subsequent analysis of pixel values. By setting the q values to zero, these pixels will now be less than T1 and T2, and will hence fail the T1, T2 test as the frame data is checked in Box 118 or 124.

Control then returns to box 114 to permit the next pixel to be identified and processed.

As already stated, after all the pixels in a frame have been considered, control is passed to box 116. This transfers the contents of the frame cluster store 76 into the cumulative cluster store 80 on the hard disk 48 so as to retain the parameter values of all "beta event clusters" from all of the frames.

It is to be noted that the threshold values T1 and T2 used in the procedure are determined by prior calibration and may be constant or dependent on the values of r and c.

Constant values of T1 and T2 mean the dark level variation (as between one region and another) of the CCD array, is not taken into account and this can result in errors in the selection of pixels belonging to a cluster.

To compensate for this, T1 and T2 are varied depending on the position of the pixel under consideration at any instant, and to this end a look-up table of dark level "correction" values for each of the pixel positions in the CCD array is stored in a further store 137 which conveniently forms part of the host memory 46.

The look-up table data may be stored in a permanent form on the hard disk 48 having been derived from an appropriate interrogation of the CCD array during a calibration interrogation of the CCD array.

The dark level correction data is thus available on the hard disk and can be read into the store 137 of the host memory 46 ready for use whenever the computer is turned on. The data on the hard disk can of course be up dated by appropriate interrogations of the CCD array either at regular intervals, or in the event that a monitored parameter such as the temperature of the CCD array, rises above or falls below preset limits.

The new values obtained by the subsequent dark level interrogation of the CCD array are substituted for those in the store 137. If the change is of a more permanent nature, the values on the hard disk may be rewritten.

In calculating T1 and T2 the dark level correction signals may be employed by adding to the dark level in any pixel different offsets for T1 and T2 so that the value of T1 and T2 varies in accordance with the variations in the dark level across the array. Threshold values are therefore caused to vary from one pixel to another to accommodate variation in the "dark level" of the camera. By this means the criterion for identifying pixels as cluster seeds or cluster members can be made substantially constant across the whole of the camera field of view.

Alternatively, the offsets themselves may be made to vary from pixel to pixel in proportion to any gain variation of the camera across the CCD array. This will then make substantially constant the criterion for identifying pixels as cluster seeds or cluster members across the field of view, to allow for both dark level variations and gain variations.

Alternatively the dark level correction signals and the gain variations associated with each pixel may be used to modify the q value in the pixel in subsequent read-out, in which event the thresholds T1 and T2 can remain constant.

Figure 3B:
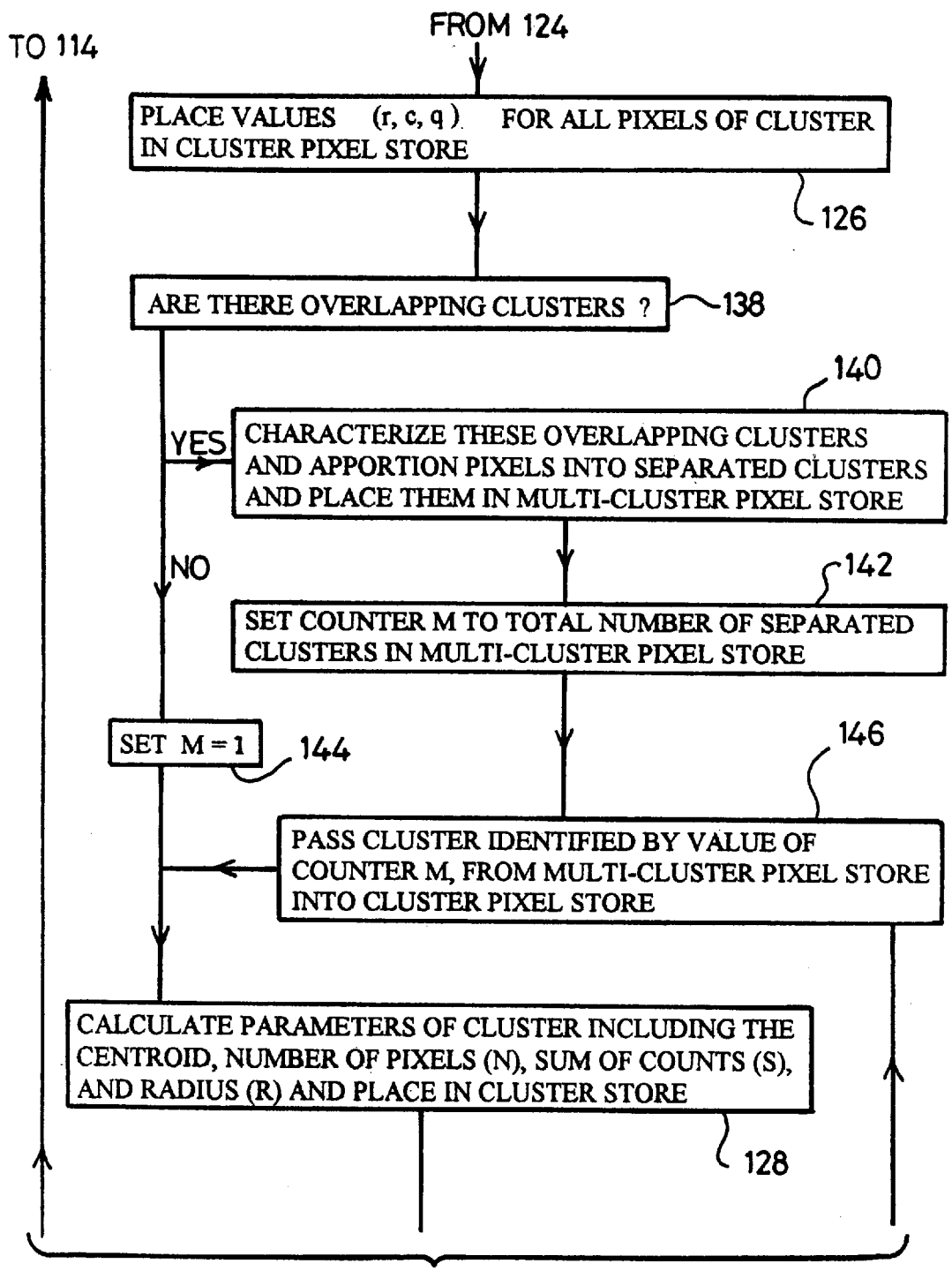

FIG. 3b shows a preferred version of the cluster finding process described with reference to FIG. 3a, in which additional features are incorporated to allow for the possibility that some clusters which might be found using the logic of FIG. 3a, may in fact consist of more than one radiation decay event.

The probability of such overlapping events causing "multi-cluster" formation, increases with sample activity.

The path between boxes 126 and 128 in FIG. 3a, has been extended in FIG. 3b, to include a test for overlapping clusters in box 138.

Box 138 runs an algorithm to check if the cluster values passed from box 126 in fact contained data from more than one radiation decay event. This condition is defined as occurring if a cluster identified by the FIG. 3a logic is found to contain two or more well separated pixels whose q values are both greater than the threshold T1.

To this end a two dimensional profile of the q values belonging to the cluster pixels in the cluster pixel store is searched to see if it corresponds to a single peak or to two or more peaks, with clear valleys between, (where a "valley" implies a string of connected pixels whose values are significantly below the peak values).

If only one peak is identified for the cluster, no further action is taken since it is accepted as only one cluster.

If however, two or more "peaks" (as defined above) are detected, control passes to box 140 where the pixels making up the cluster pixel store are divided into two (or more) separate clusters, centered on the individual peaks, and are stored in a multi-cluster pixel store 78 in FIG. 2.

The values between the peaks are used to define the boundaries between each separated cluster, and pixels in, or near, valleys may have their values apportioned between two or more such overlapping clusters.

In box 142, a counter is set to the number M of separate clusters, and in box 146, each of the separated clusters is uniquely identified with a number in the series 1 to M. Box 146 passes the "r,c,q" values for the pixels belonging to each of the M separated clusters in turn, to box 128, for its parameters to be computed (as described above) to allow it to be classified as a beta event cluster or not. After the Mth cluster has been analyzed and classified control returns to box 114.

Choice of Intensified CCD camera

The preferred camera consists of three components all of EEV design and manufacture, integrated into a complete intensified CCD camera assembly for interfacing to the dataprocessing circuits described with reference to FIG. 2.

The major preferred components are:

1. An image intensifier stack consisting of two EEV/ 8370A/25:18 mm demagnifying, first generation, electrostatic focus, image intensifiers using modified cathodes of Bi-alkali type giving low EBI and low red sensitivity, combined with integral high voltage multipliers with intensifier stack earthed at both ends by using extended output to optic stand off up to 30kV.

2. A CCD image sensor comprising an EEV/CCD 02–06 frame transfer scientific image sensor having the following characteristics:
   a. 385 addressable regions (pixels) per line and 288 lines per field,
   b. each addressable region (pixel) being 22 microns square.
   c. adapted to operate in so-called inverted mode processing, allowing dark current reduction to approximately $10pA/cm^2$ at 20° C.,
   d. a pixel capacity greater than 100,000 electrons,
   e. non-anti-bloomed for 100% fill factor, and
   f. a fiber optic input window bonded to the image area.

3. A CCD driver capable of 1MHz pixel output rate to drive the CCD 02–06 sensor, and having the following characteristics:
   a. read-out noise performance of less than 20 electrons RMS per pixel with the CCD operating at 1MHz pixel range (excluding dark current shot noise),
   b. analogue, low impedance video output and logic level synchronization pulses, and
   c. an electrically reprogrammable gate array, programmed to drive the CCD sensor and provide signals required to interface correctly and efficiently with the processing system of FIG. 2.

Adjustment of threshold T3

Normally the value of threshold T3 described in relation to FIG. 2, will be set at a value less than or no greater than threshold T2, since otherwise pixels belonging to a cluster may be lost. If T1 and T2 are pixel dependent values to take account of CCD dark level variation (and gain variation), then the value of T3 will also need to be made pixel dependent (and gain dependent) and a look-up table of values for T3 provided (or a table of offset values for adding to T3) and the processor 44 must be programmed to cause the readout of the appropriate value in synchronism with the interrogation of the CCD array, so as to provide appropriate values of T3 for the different addressable regions (pixels) in the array, as the latter is addressed during each interrogation step.

Figure 3C:
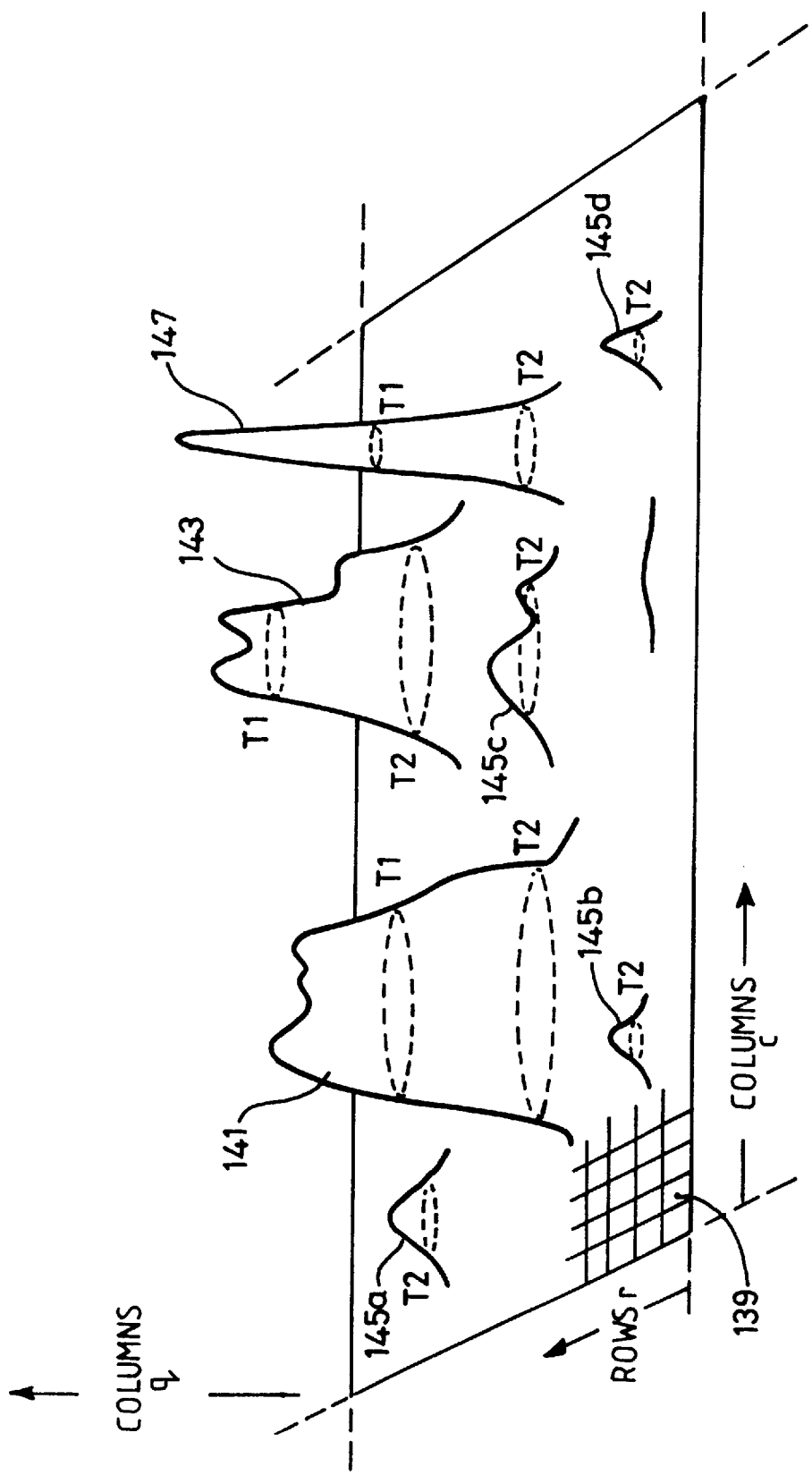

The invention enables multiple parameters to be used with which to profile and discriminate the different energies of beta events from different isotopes. Depending on the phosphor, and/or the isotope used to label material whose presence is to be determined, the radius R or the number of pixels N or the sum of counts S may be different for different energies and accordingly the values of R and N and S used to determine the acceptance or rejection of a cluster as a beta event, need to be adjustable to take account of the different isotopes which may be used. Look-up tables of different values which may be used when different isotopes are employed may be provided in a separate store on the hard disc 48 which can be read out as required and appropriate values stored in threshold store 74 in the RAM. FIG. 3(c) shows the typical charge distributions which remain on the CCD "pixels", one of which is identified at 139, after an exposure to the photon activity from a phosphor reacting to a sample from which two beta events have occurred (charge excursions 141 and 143), four background noise induced photon activities have occurred (charge excursions 145a, 145b, 145c and 145d), and one ion event within the image intensifier has occurred resulting in photon activity and a resulting charge excursion at 147.

The directions in which r and c are measured are shown. Charge quantity q is denoted by the height of the excursions above the "flat" surface of constant (zero) charge on the CCD surface (pixels 139).

The narrow gaussian shape of the ion event photon activity is clearly demonstrated as compared with the very non-gaussian charge distribution occasioned by the beta event induced photon activity related excursions.

The levels at which the thresholds T1 and T2 might be applied are shown relative to the charge excursions.

Higher speed option

Figure 4:
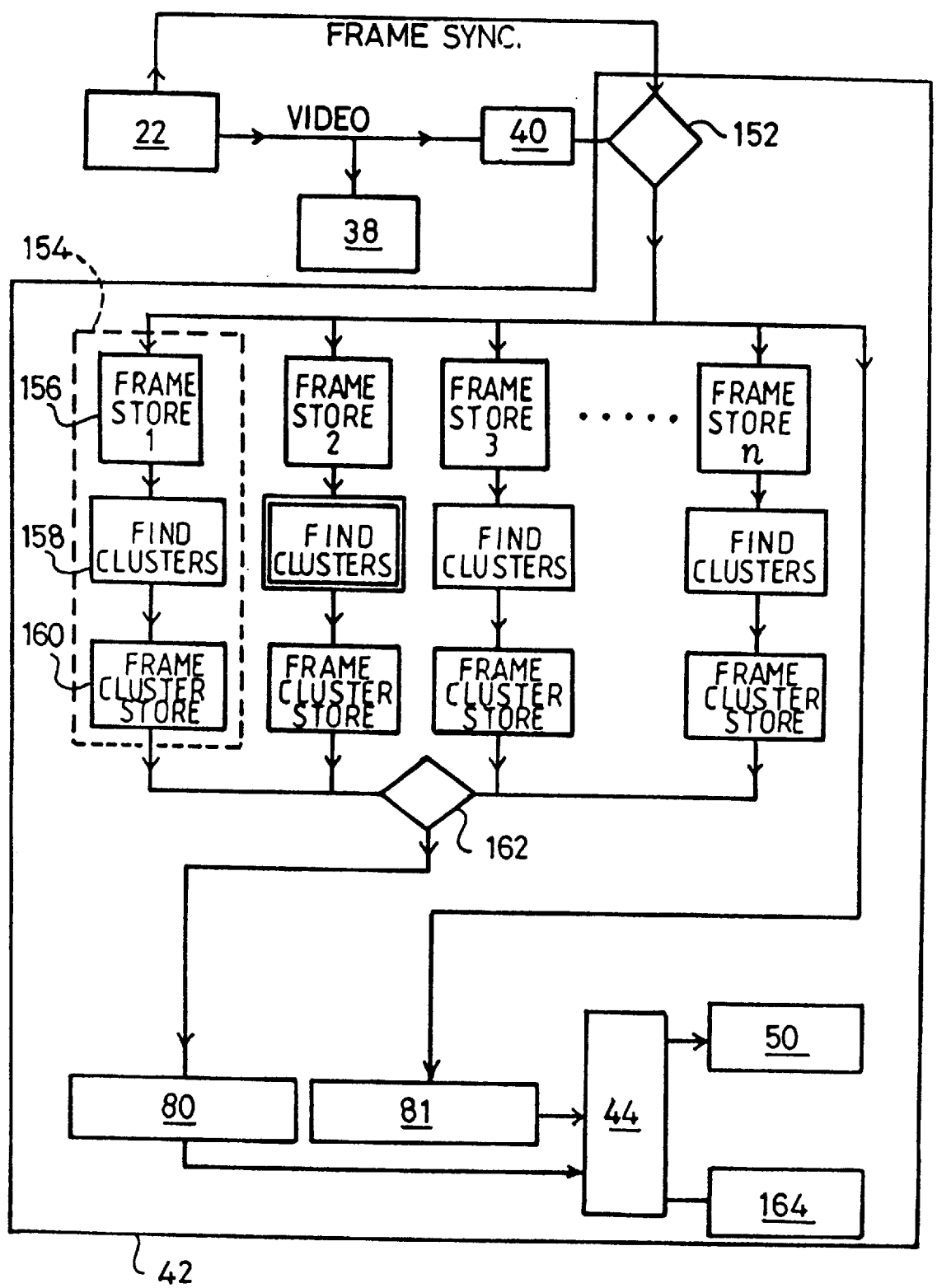

FIG. 4 shows a variation of the computing and data processing section 42 of Figure 1a.

The different approach enables data to be processed at even higher speed by using a series of parallel processing lines each of which is supplied with data from each one of a succession of frames thereby allowing more time for the cluster finding and cluster identification steps to be performed on the live data.

To this end the output from the camera 22 via FADC 40 is supplied to a multiplexer 152 which serves as a data-switch for transferring data first to one and then another in turn of a series of parallel data processing lines, one of which is identified by dotted outline 154. Each line includes a frame store 156, a processor 158 programmed in the same way as the host processor 44 in FIG. 2 is programmed to find clusters, and a frame cluster store 160 for storing the data relating to identified clusters from the frame of data temporarily held in the frame store 156.

By providing n parallel lines, the time available for processing to find clusters and identify wanted clusters from unwanted clusters, can be made equal to n times the frame period of the CCD camera 22.

Each of the n frame cluster stores 160 is synchronously addressed in succession by a second multiplexer 162 which transfers in turn the cluster data from each of the frame cluster stores 160 to the cumulative cluster store 80 on the hard disc of the host computer. The operation is under the overall control of the host processor 44 which in turn allows the data from the screen store 81 and the cumulative cluster store 80 to be displayed in a SVGA display monitor 50 as previously described and also enables the x,y coordinates with or without photon activity related data to be output for numerical analysis for example as a print-out via a printer 164.

To enable the highest possible speed to be obtained, each of the lines 154 is preferably configured independently using an appropriate digital signal processor and a high speed readable and addressable random access memory associated therewith to provide the frame store and frame cluster store associated with each processor each of which is conveniently a Texas Instruments DSP.

Figure 5:
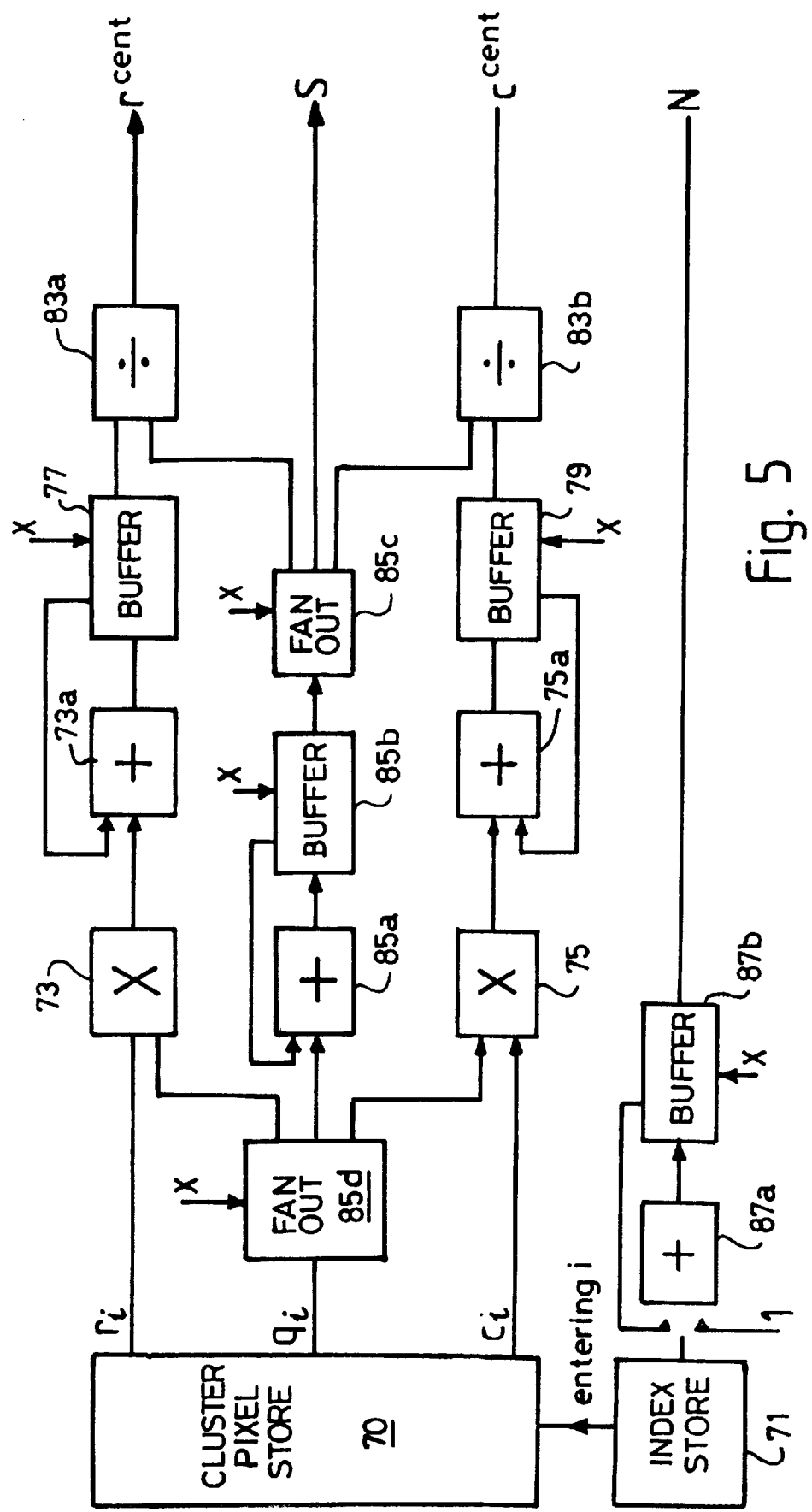

FIG. 5 shows a logic array for calculating S, $r^{cent}$ and $c^{cent}$ for a group of pixels in a cluster which could be used in place of a single programmed processor such as 44.

The list of $(r_i, c_i, q_i)$ values is stored in the Cluster Pixel Store 70 which is implemented in RAM 40.

The Index Store box 71 is logic which counts through the N pixel values known to be stored in the Cluster Pixel Store 70 and causes each set of $(r_i, c_i, q_i)$ values to appear on the outputs of that store 70 in turn.

These values are passed out to Multiply boxes 73, 75 where $q_i r_i$ and $q_i c_i$ are calculated.

The sums of the $q_i r_i$ and $q_i c_i$ are accumulated in the two Buffers 77, 79 via the Sum boxes 73a, 75a and the Feedback from the Buffers. (The buffers are assumed to be initialized to zero at the start of the calculation).

The buffer and feedback implement the code fragments: buffer=buffer+$q_i r_i$, etc for 73a and buffer=(buffer+$q_i c_i$) for 75a.

At the end of the sum the final buffer contents are passed to two Divide boxes 83a and 83b, where division by S is performed.

The central path of sum box 85a, buffer 85b and fan out box 85c, computes the sum of the $q_i$ values in a similar fashion and hence provides the value of S needed for the divisions shown.

The Fan Out boxes such as 85c and 85d are simple devices which produce identical parallel outputs from a single input.

The last path of sum box 87a and buffer 87b, calculates the value of N by summing the value "1", N times.

Details of the initialization and gating to pass the final contents of the summation buffer memories on to the divide boxes are not shown. The final results are passed to memories (or latches) also not shown.

Figure 6:
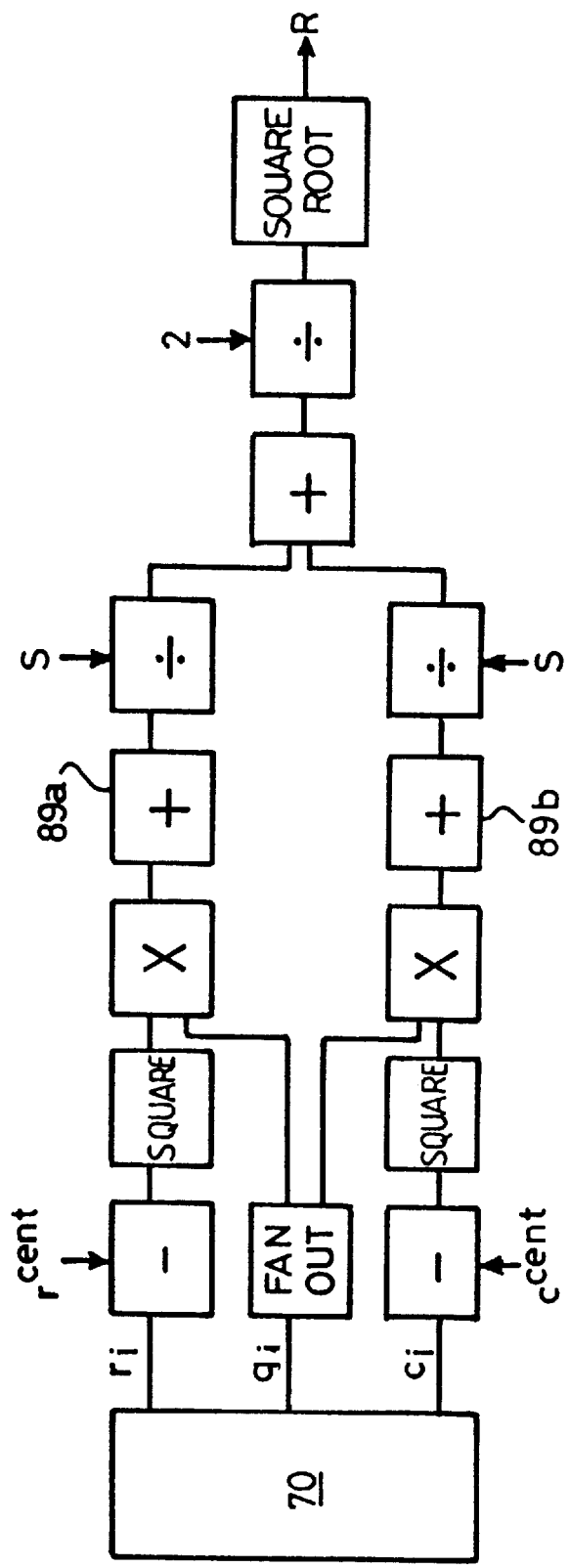

FIG. 6 shows an implementation for calculation of radius R again using logic devices instead of a single programmed processor such as 44.

In this implementation, radius R, is calculated once $r^{cent}$, $c^{cent}$. N and S are known using the formulae given earlier in relation to FIGS. 3a and 3b, for $r^{cent}$, $c^{cent}$, and S.

The separate function boxes in FIG. 6 are not here described in detail since it will be clear from their markings in the Figure the nature and purpose of their individual functions and how they interact.

Although not shown in FIG. 6, a buffer memory and feedback should follow each of the sum boxes 89a and 89b, as in the previous Figure.

The parameters calculated by the FIG. 5 circuit are fed in (for example via latches) at appropriate points.

Implementation

All the logic functions could be implemented as suitably programmed Texas DSP devices eg the TMS320C50. Algorithms for programming these chips and full details of interfacing associated memory (RAM) and input-output devices, are given in a series of technical manuals published by Texas Instruments, including: TMS320C5X Users Guide 1993 (Part Number SPRU056B), and Digital Signal Processing Applications with the TMS320 Family (1989 part number SPRA012A).

An alternative implementation would be to use discrete logic chips, for example transistor to transistor (TTL) logic components.

Sample Presentation

Figure 7A:
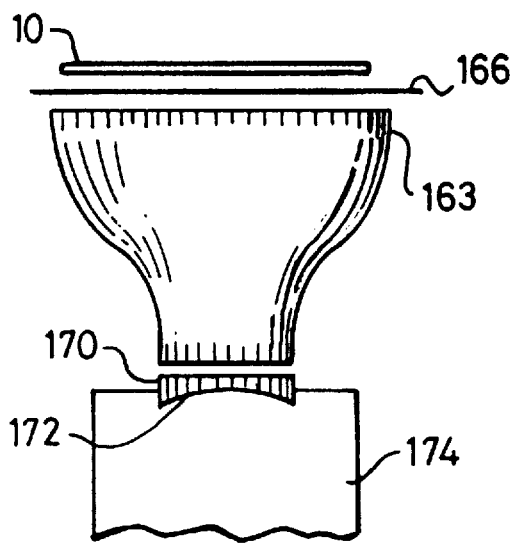
Figure 7C:
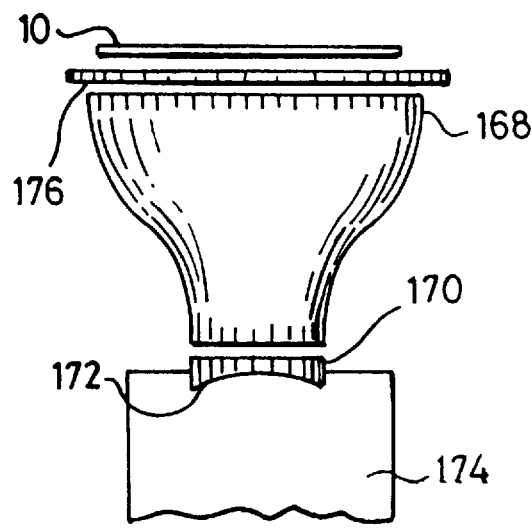
Figure 7B:
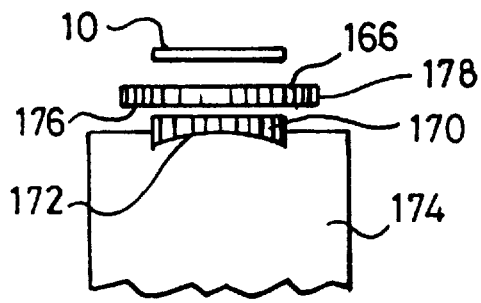

FIGS. 7a, 7b and 7c illustrate three different arrangements of the sample, phosphor film and fiber optic coupling plate.

In FIG. 7a the signal produced by the phosphor 166 in response to the radiation, is incident on a tapered fiber optic plate 168. The plate 168 presents a large area commensurate with the sample area but tapers to a smaller area commensurate with that of the fiber optic input 170 to the photocathode 172 of the image intensifier. This demagnification permits the larger sample area to be viewed by the CCD camera 174 than would otherwise be the case.

A reversal of the taper so that the larger area of the tapered fiber optic plate 168 is presented to the photocathode 172, allows for magnification of the sample area.

In another preferred embodiment as shown in FIG. 7B, the phosphor coating 166 is deposited directly onto a fiber optic coupling plate 176. This eliminates the need for a separate support medium for the phosphor 166. A flange 178 is provided around the edge of the plate 176 for ease of handling.

The plate 176 can be used separately with a tapered optical fiber plate 168 as shown in FIG. 7C.

Figure 8:
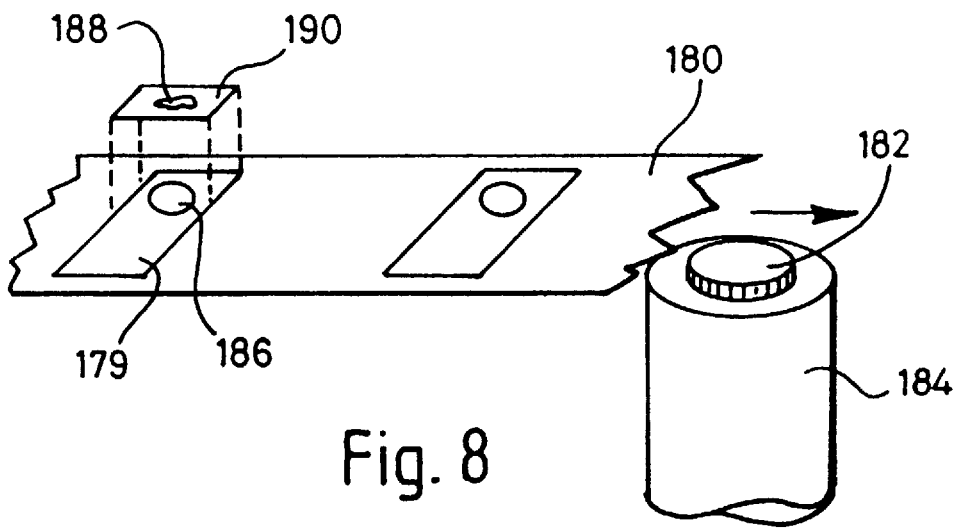

FIG. 8 shows an automated system for presenting samples to be measured. The system comprises a number of cartridges 179 spaced apart along a feed conveyor 180 which passes directly above a fiber optic coupling plate 182 of an image intensifier 184. Each cartridge 179 consists of one or more phosphor films 186 mounted in a support material onto which a sample 188, attached to the underside of 190, is placed. The cartridge may be indented to facilitate handling by an autofeeder. The sample 188 is then automatically scanned and the radiation therefrom mapped and stored as a series of coordinates possibly in combination with data indicative of the shape of the specimen containing the labelled isotope producing the radiation. The sample is then indexed so that the next sample is presented for scanning and subsequent analysis and storage of coordinate data relating thereto.

Dark level and threshold correction

Normally the dark level response of each pixel is obtained from a measurement of the statistical distribution of counts in that pixel for a reasonable number of frames (for example 1000) in the absence of light or other radiation. The results of these measurements may be stored in the threshold store 74 (or a dedicated dark level correction signals store 137) and analyzed using the host processor 44. A dark level look-up table can thus be created in the threshold store 74 (or store 137) by entering the mean value of the dark level response from each pixel defined by its address r and c. Likewise other look-up tables for each of the thresholds T1, T2 and T3 can be created and stored in 74 by adding appropriate offsets to the counts corresponding to the dark level value of any pixel, such offsets being based on measurements of statistical distributions of typical thermoelectron, ion and other background events, and statistical distributions of radiation decay events from other sources, as required.

These offsets may be either constant across the field of view or allowed to vary with the pixel address r and c. Such variation of offsets with pixel address may be obtained by comparing the response as between pixels when the system is exposed to radiation sources which are uniform across the field of view.

Figure 9:
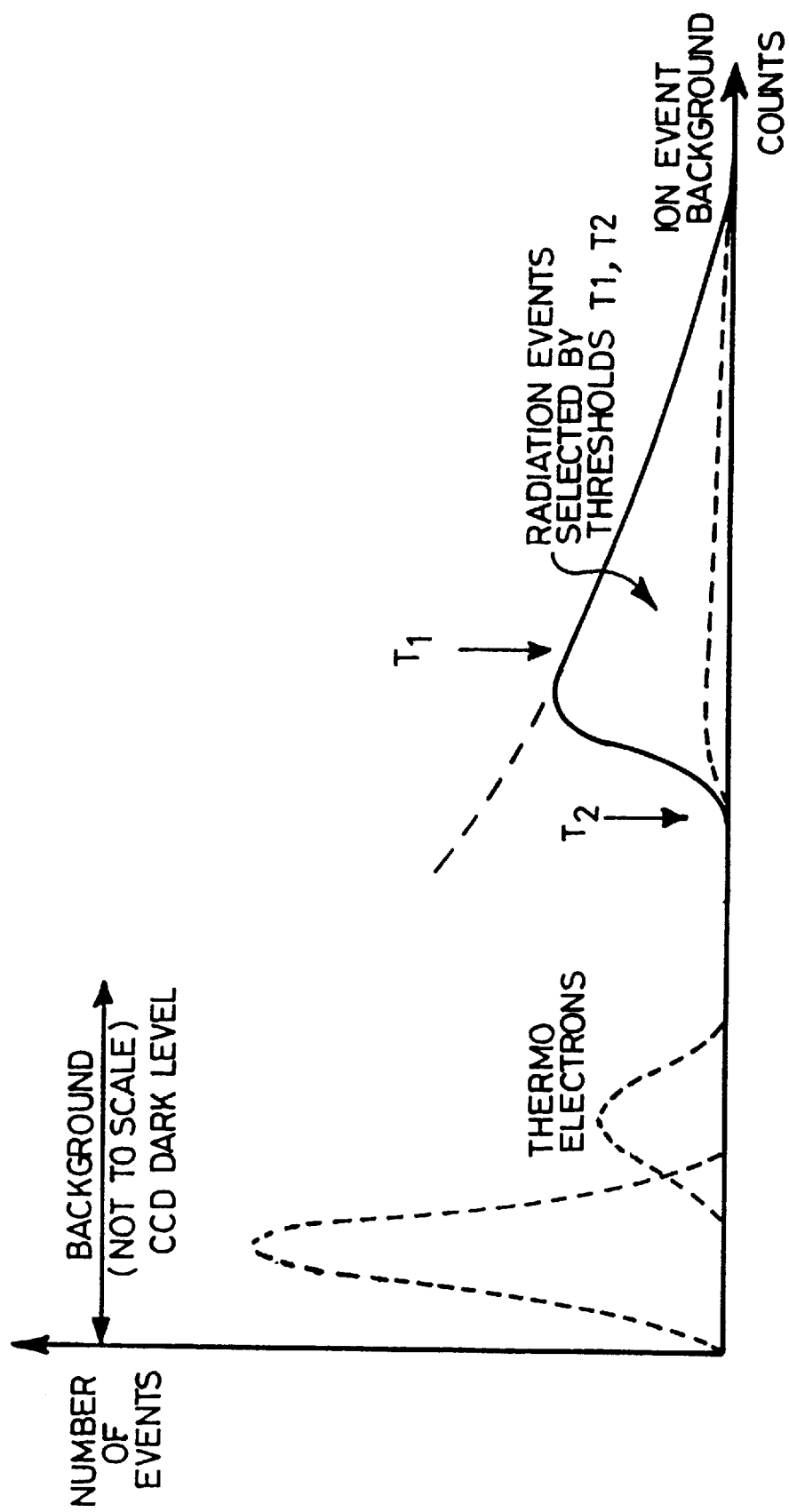
Figure 10:
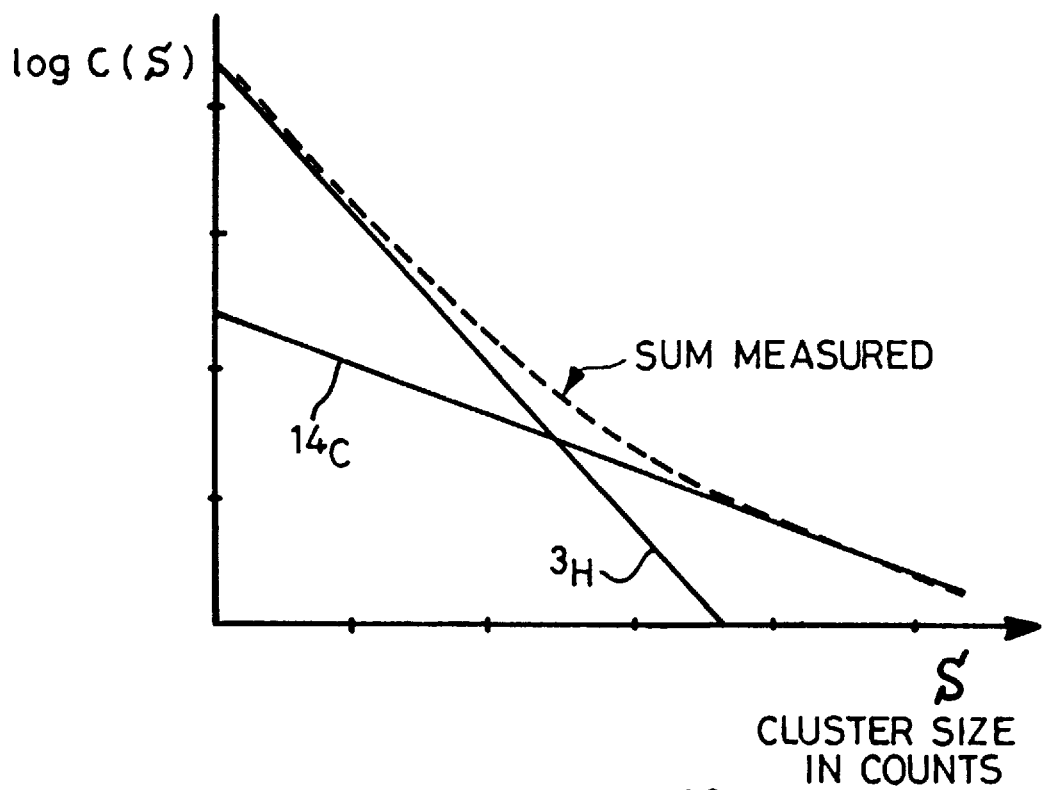

A typical distribution of photon energy/charge "counts" associated with one pixel in a CCD array such as described herein, for different types of event which can occur over a period of time, is shown in FIG. 9, which should be viewed in conjunction with FIG. 3(c).

Multiple labelling

Cluster energy cannot be measured directly. Instead the parameters already described, ie N, S and R are measured for each cluster, each of which is related to the energy of the originating beta disintegration.

There follows a worked example. Suppose we measure C events within a chosen sub-area which are distributed in the quantity S as C(S). We write this as $$C(S) = C_{3H}(S) + C_{14C}(S) \qquad (see\ FIG.\ 10)$$

C can be expressed in units of CPM/mm$^2$ which means counts per minute per mm$^2$. To make a statistical division into the two isotopes we need to know a priori what the individual distributions for $^3$H and $^{14}$C are. We get these by measuring separate calibration samples in each isotope made of a matrix as closely representative as possible to the sample and of known activity. Such matrices representative of tissue sample are, for example made by Amersham International, called "radioautographic micro-scales" and are constructed of layers of radioactive polymer containing different amounts of known radioactivity, which are independently measured by scintillation counting. Suppose we measure the quantity $n_{3H}(S)$ to be the distribution from a standard Tritium sample, measured in units of CPM/mm$^2$ per unit activity of the standard expressed in nCi/mg (nanocuries per milligram), and likewise for $^{14}$C. We can then write:

$$C(S) = a_{14C} n_{3H}(S)$$

where each a represents the actual amount of the isotope expressed in nCi/mg which is to be found. The a values are obtained as the best fit to the measured distribution C(S) using a standard statistical method such as "maximum likelihood". In practice one has to take into account the influence of background in doing such a fit and choose a range of S values to minimize such effects eg eliminate small S values below a certain threshold which might contain a background contribution.

The distributions in other measured quantities N and R can be expressed as C(N) and C(R) and similarly analyzed to give a values which should be compatible with those already obtained.

Alternatively one can obtain the a values by subjecting the three distributions C(S), C(N) and C(R) simultaneously to a maximum likelihood solution method.

From an analysis like that above one can obtain the activity $a_{3H}$ pertaining to any small sub-area of the sample and a color display can be generated with intensity of the color relating to the activity if so desired. One could likewise show the activity $a_{14C}$ in another color on the same display if one wanted to compare and contrast the distribution of the activities of the chosen isotopes across the sample.

Individual clusters can be identified uniquely as one or other isotope in only a proportion of cases. For example, $^3$H produces betas in the range 0–18keV and $^{14}$C in the range 0–156keV. It follows that the upper range of S values which reflect betas of energy above 18keV should logically have come only from $^{14}$C. Because the spectrum of energy values from an isotope falls rapidly with energy and because the ratio of activities of two isotopes can in practice be as much as 10:1 it turns out that the proportion of unambiguous clusters can be small (eg 10–20%). In general, a statistical answer has to be given, but it is enough to draw an image on a display. Thus for example in a given small sub-area of a sample, measurements made on the cluster parameters might allow it to be determined that there are 100 clusters, of which 30 are probably $^3$H and 70 are probably $^{14}$C.

In practice the dimensions of the sub-areas has to be determined taking into account resolution and statistical meaningfulness. Sub-areas of the order of 0.01 to 0.1mm$^2$ have been found to be suitable. This is tolerable from the point of view of spatial resolution and on average might contain 100 clusters, which is just enough for statistical analysis. Naturally the data in the sub-areas could later be aggregated into larger regions it so desired to give the average activities of the two isotopes in the larger regions, for the purpose of analysis.

We claim:

1. A method of detecting the presence and position of radioactively labelled material in a sample, in which an area of the sample is exposed to an area of a phosphor so that radioactive decay events produce photon emission events, and the phosphor is imaged onto the photocathode of an image intensifier means, the output of which provides the optical input for a CCD camera, characterised by the steps of:

(1) repetitively scanning a CCD array of the camera, each scan corresponding to an interrogation of the array and being preceded by an exposure period and followed by a resetting step which initiates the beginning of the next following exposure period, (2) generating during each interrogation data signals whose values describe the charge pattern on the array, (3) performing measurements on the data signals to identify clusters of data values, from adjacent separately addressable sub-regions of the array indicative that photon emission from the image intensifier has impinged thereon, and (4) identifying a centre position of each identified cluster of data values and storing the center coordinates in a memory together with the centre coordinates of any other identified clusters occurring during the same interrogation; wherein (5) the step of performing measurements on the data signals includes examination of clusters appertaining to adjacent sub-regions of the array, in real time, applying a sizing criterion to each identified cluster and rejecting any cluster possessing fewer than a predetermined number of sub-regions so that no centre coordinates therefor are stored.

2. The method of claim 1, in which the phosphor is supported on a thin film which is in contact with an input fibre optic window of the image intensifier means.

3. The method of claim 1, wherein the sample is in contact with the phosphor.

4. The method of claim 1, wherein the quantity of photon activity incident on the sub-regions associated with each cluster is measured during each interrogation period and a photon activity signal generated, proportional thereto.

5. The method of claim 4, wherein the photon activity signal values are stored in memory as a further electrical information signal for each cluster, in association with the centre coordinates of the relevant areas.

6. A method of detecting the presence and position of radioactively labelled material in a sample, in which an area of the sample is exposed to an area of a phosphor so that radioactive decay events produce photon emission events, and the phosphor is imaged onto the photocathode of an image intensifier means, the output of which provides the optical input for a CCD camera, characterised by the steps of:

(1) repetitively scanning a CCD array of the camera, each scan corresponding to an interrogation of the array and being preceded by an exposure period and followed by a resetting step which initiates the beginning of the next following exposure period, (2) generating during each interrogation data signals whose values describe the charge pattern on the array, (3) performing measurements on the data signals to identify clusters of data values, from adjacent separately addressable regions of the array indicative that photon emission from the image intensifier has impinged thereon, and (4) identifying a centre position of each identified cluster of data values and storing the centre coordinates in a memory together with the centre coordinates of any other identified clusters occurring during the same interrogation; wherein (5) signals characteristic of thermally stimulated noise electron emissions which can occur within the image intensifier are identified and removed from the output electrical signals, said identification and removal being effected by applying a threshold which causes solitary, small numerical value, information signals to be ignored and only generates centre coordinate signals from clusters having numerical values of information signal which are greater than the threshold value, and are part of a cluster equivalent to an event of K photoelectrons activity, so that only the centre coordinates of such clusters will be stored.

7. The method of claim 6, wherein different thresholds are employed for different combinations of radioactively labelled material and phosphor.

8. The method of claim 6, comprising the step of examining clusters of contiguous sub-regions found in an interrogation, in real time, and generating centre coordinate signals therefor if an activity signal sum greater than the equivalent of K photoelectrons activity within the cluster is found to exist.

9. The method of claim 8, wherein the examination step involves identifying any sub-region having a signal value above a first threshold value and determining if a group exists by checking sub-regions contiguous with each identified sub-region, for next neighbor sub-regions where photon activity related signal values are above a second but lower threshold value.

10. The method of detecting the presence and position of radioactively labelled material in a sample, in which an area of the sample is exposed to an area of a phosphor so that radioactive decay events produce photon emission events, and the phosphor is imaged onto the photocathode of an image intensifier means, the output of which provides the optical input for a CCD camera, characterised by steps of:

(1) repetitively scanning a CCD array of the camera, each scan corresponding to an interrogation of the array and being preceded by an exposure period and followed by a resetting step which initiates the beginning of the next following exposure period, (2) generating during each interrogation data signals whose values describe the charge pattern on the array, (3) performing measurements on the data signals to identify clusters of data values, from adjacent separately addressable regions of the array indicative that photon emission from the image intensifier has impinged thereon, and (4) identifying a centre position of each identified cluster of data values and storing the centre coordinates in a memory together with the centre coordinates of any other identified clusters occurring during the same interrogation, comprising the further step of determining the total charge on the CCD sub-regions pertaining to each cluster identified as an event and noting the size of each cluster and combining both pieces of information for each cluster, and applying a thresholding algorithm to determine the nature of the cluster thereby to classify the originating event as a radioactive decay event or not, the size being measured by the number of sub-regions making up the cluster.

11. A method of detecting the presence and position of radioactively labelled material in a sample, in which an area of the sample is exposed to an area of a phosphor so that radioactive decay events produce photon emission events, and the phosphor is imaged onto the photocathode of an image intensifier means, the output of which provides the optical input for a CCD camera, characterized by the steps of:

(1) repetitively scanning a CCD array of the camera, each scan corresponding to an interrogation of the array and being preceded by an exposure period and followed by a resetting step which initiates the beginning of the next following exposure period, (2) generating during each interrogation data signals whose values describe the charge pattern on the array, (3) performing measurements on the data signals to identify clusters of data values, from adjacent separately addressable sub-regions of the array indicative that photon emission from the image intensifier has impinged thereon, and (4) identifying a centre position of each identified cluster of data values and storing the centre coordinates in a memory together with the centre coordinates of any other identified clusters occurring during the same interrogation, which in each sub-region of the CCD array addressed for information is defined as a pixel and the photon activity related signal $q_i$ for each pixel obtained during each interrogation is compared with a threshold T3 and if its value $q_i$ is greater than T3, the pixel coordinates and the $q_i$ values are retained for further processing, in which each pixel is compared with upper and lower thresholds (T1 and T2) and $q_i$ values of adjacent pixels are compared and pixels identified as belonging to a cluster where a group of immediately adjacent pixels all have a $q_i$ value which satisfies T2 and where at least one pixel satisfied the higher threshold T1.

12. The method of claim 11, wherein the coordinates and $q_i$ values of pixels whose values $q_i$ satisfy the lower T2 threshold are retained and stored and a cluster is classified as being caused by a radioactive decay event if the number of pixels in the group of immediately adjacent pixels is greater than $n_1$ and less than $n_2$ and the values of $n_1$ and $n_2$ are stored in a look-up table for use as required depending on the radioactive material used.

13. The method of claim 11, in which the $q_i$ value for each pixel in an identified group is added to the $q_i$ values for all other pixels in the identified group and the identified group is further confirmed as corresponding to radioactive decay event if the sum (S) of the $q_i$ values for the group is greater than a predetermined value W and values of W are stored in a look-up table memory, and utilised as appropriate depending on the radioactive material used.

14. The method of claim 11, wherein a weighted radius of each identified cluster is computed using the algorithm $R=\sqrt{(\delta_x^2+\delta_y^2)}/\sqrt{2}$, where $\delta_x$ and $\delta_y$ are the standar deviations of the $q_i$ weighted projections onto the x and y axes of the CCD array of the pixels belonging to the cluster.

* * * * *